H. J. HAIGH & I. S. BODKIN.
MACHINE FOR MAKING BAKING PANS.
APPLICATION FILED NOV. 2, 1917.

1,270,816.

Patented July 2, 1918.

INVENTORS
H. J. Haigh & I. S. Bodkin

Criswell & Davis their ATTORNEYS.

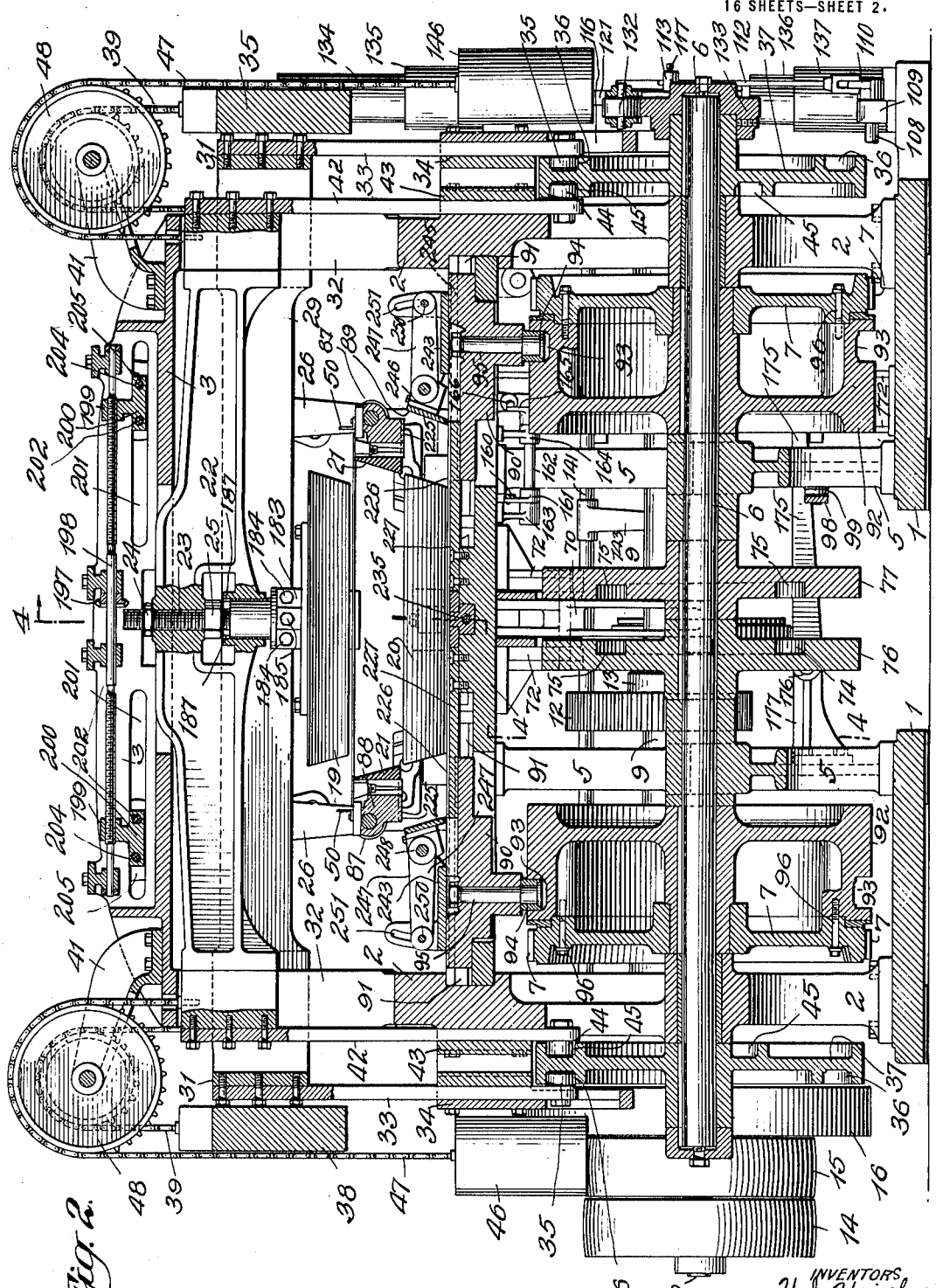

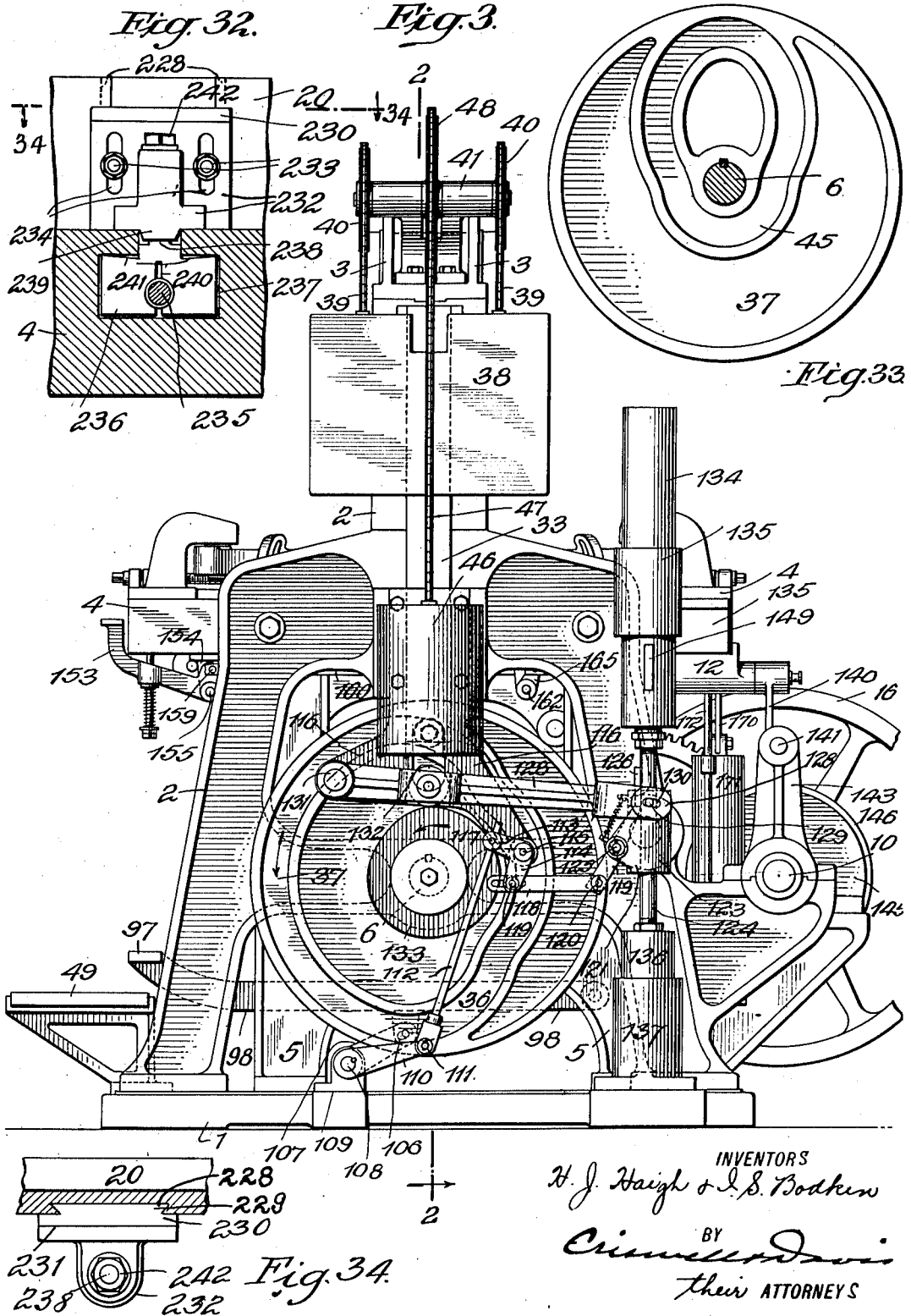

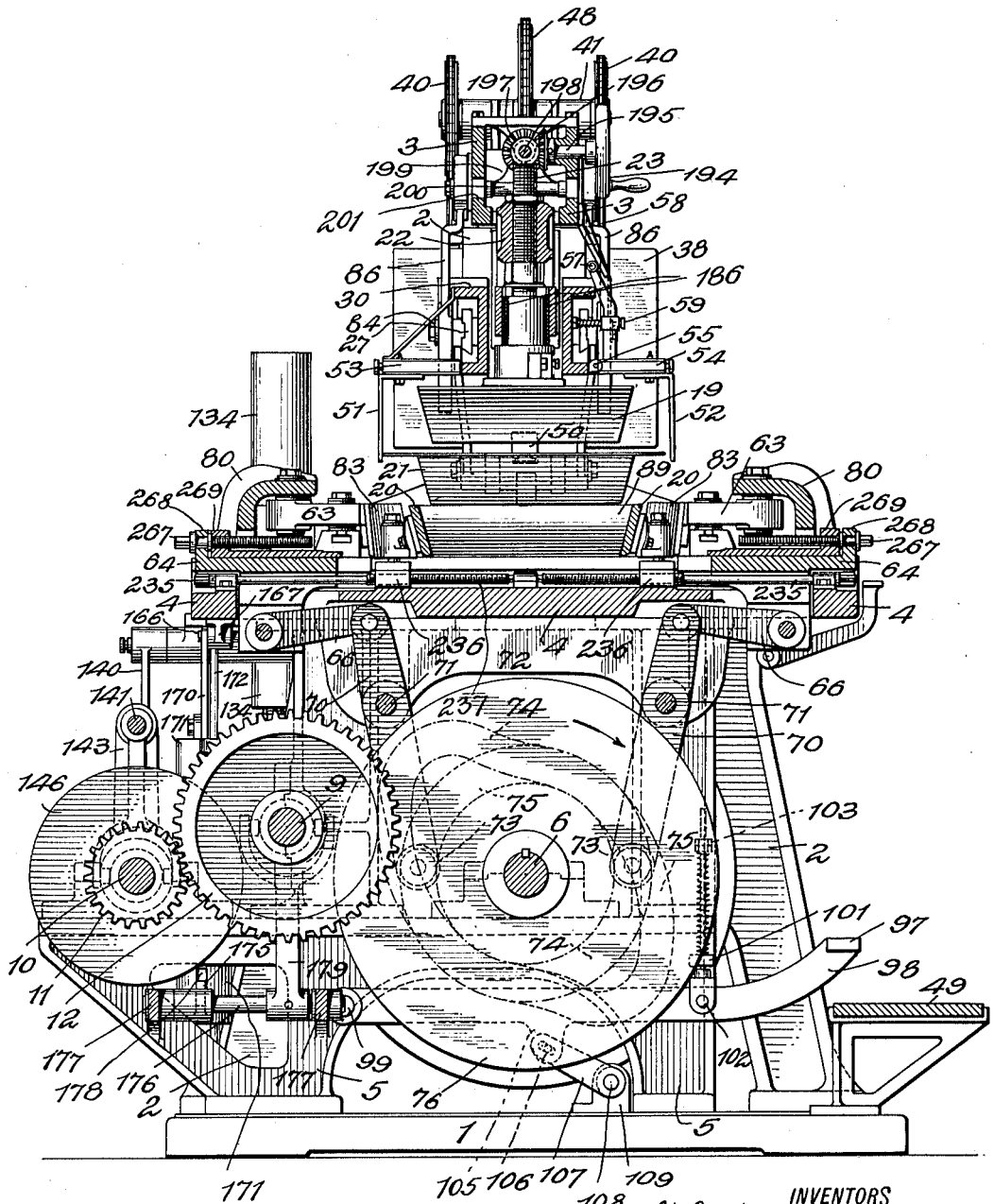

H. J. HAIGH & I. S. BODKIN.
MACHINE FOR MAKING BAKING PANS.
APPLICATION FILED NOV. 2, 1917.
1,270,816.
Patented July 2, 1918.
16 SHEETS—SHEET 5.
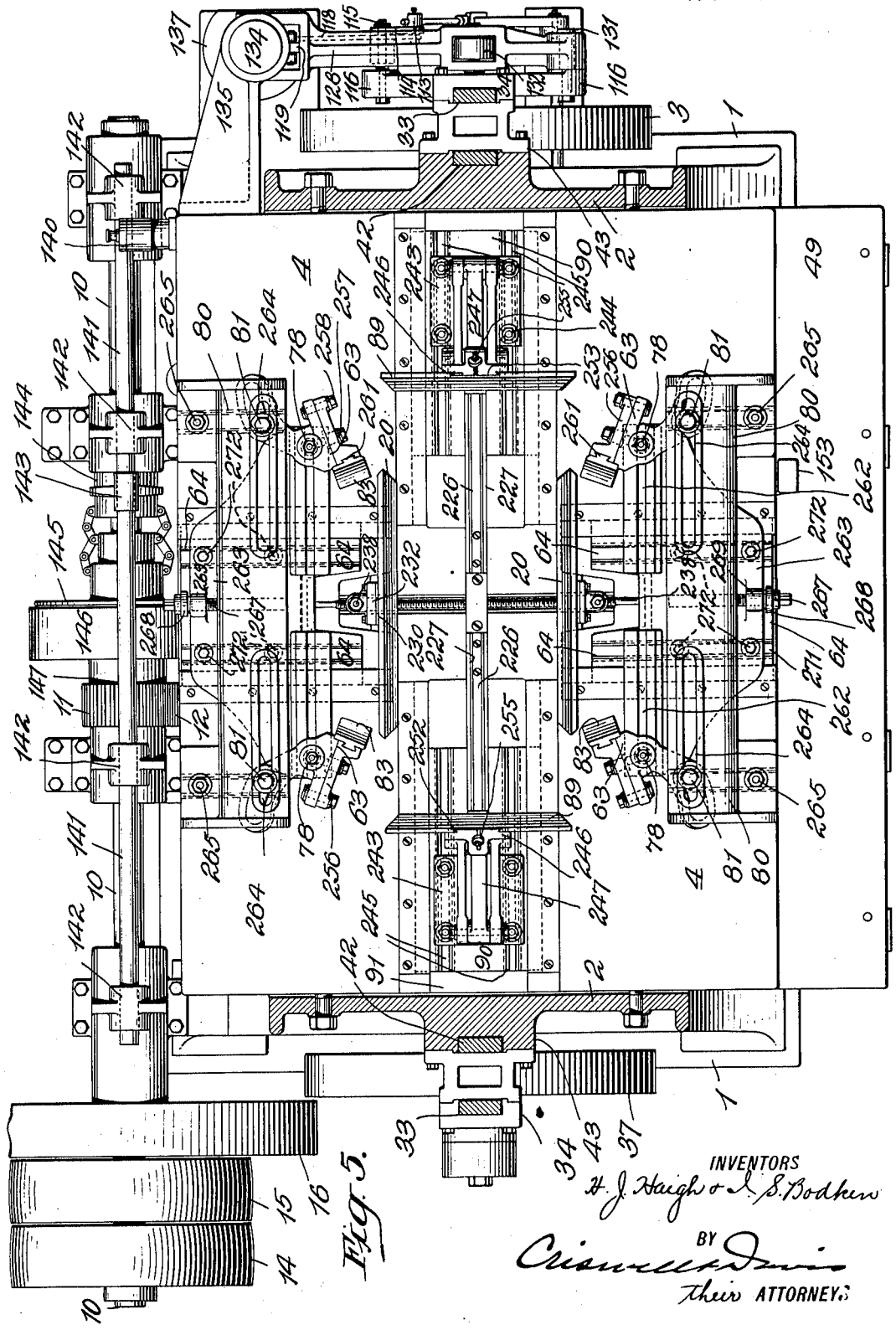
INVENTORS
H. J. Haigh & I. S. Bodkin
BY
Criswell Davis
Their ATTORNEYS H. J. HAIGH & I. S. BODKIN.
MACHINE FOR MAKING BAKING PANS.
APPLICATION FILED NOV. 2, 1917.
1,270,816.
Patented July 2, 1918.
16 SHEETS—SHEET 6.
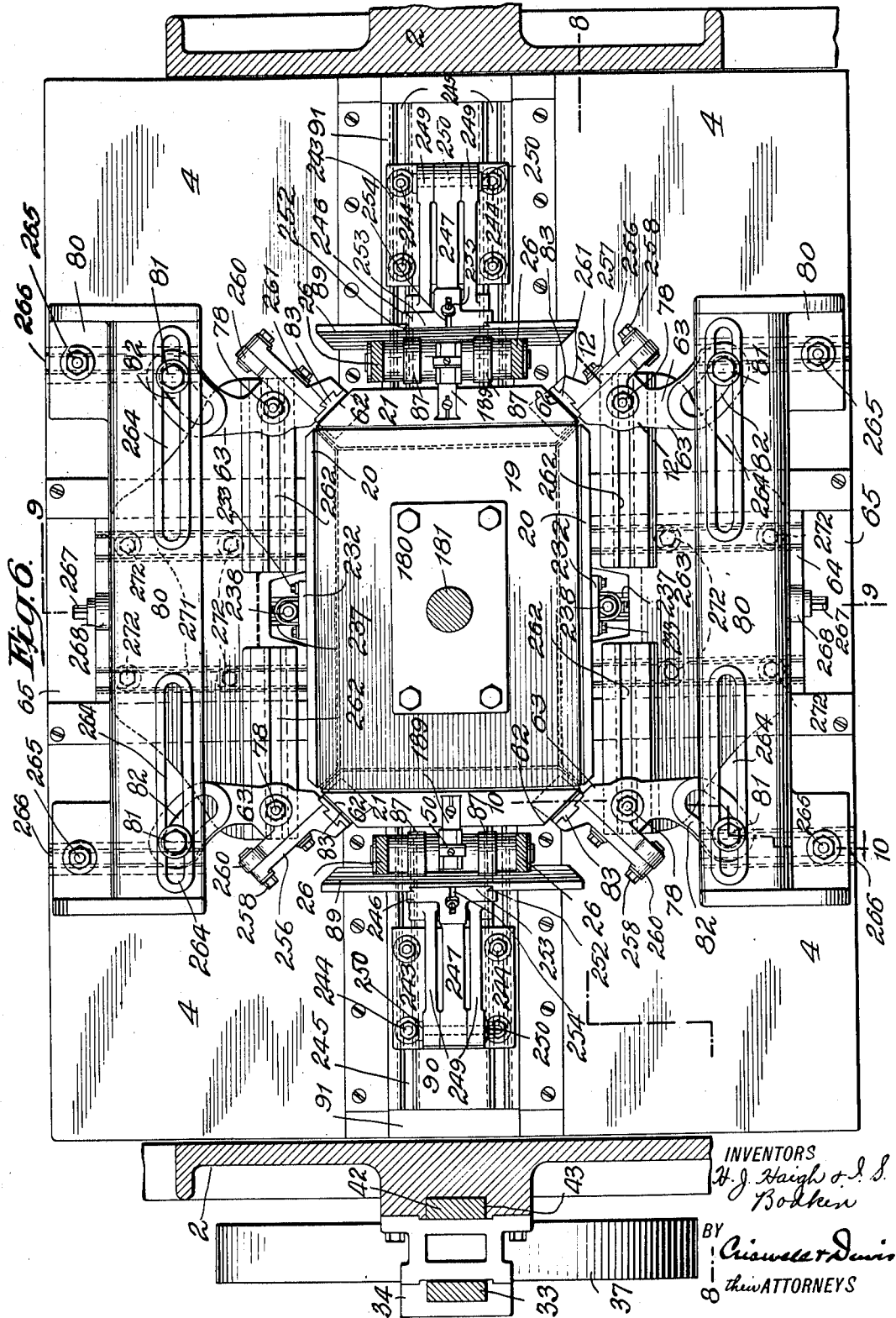
INVENTORS
H. J. Haigh & I. S. Bodkin
BY Criswell & Davis
their ATTORNEYS

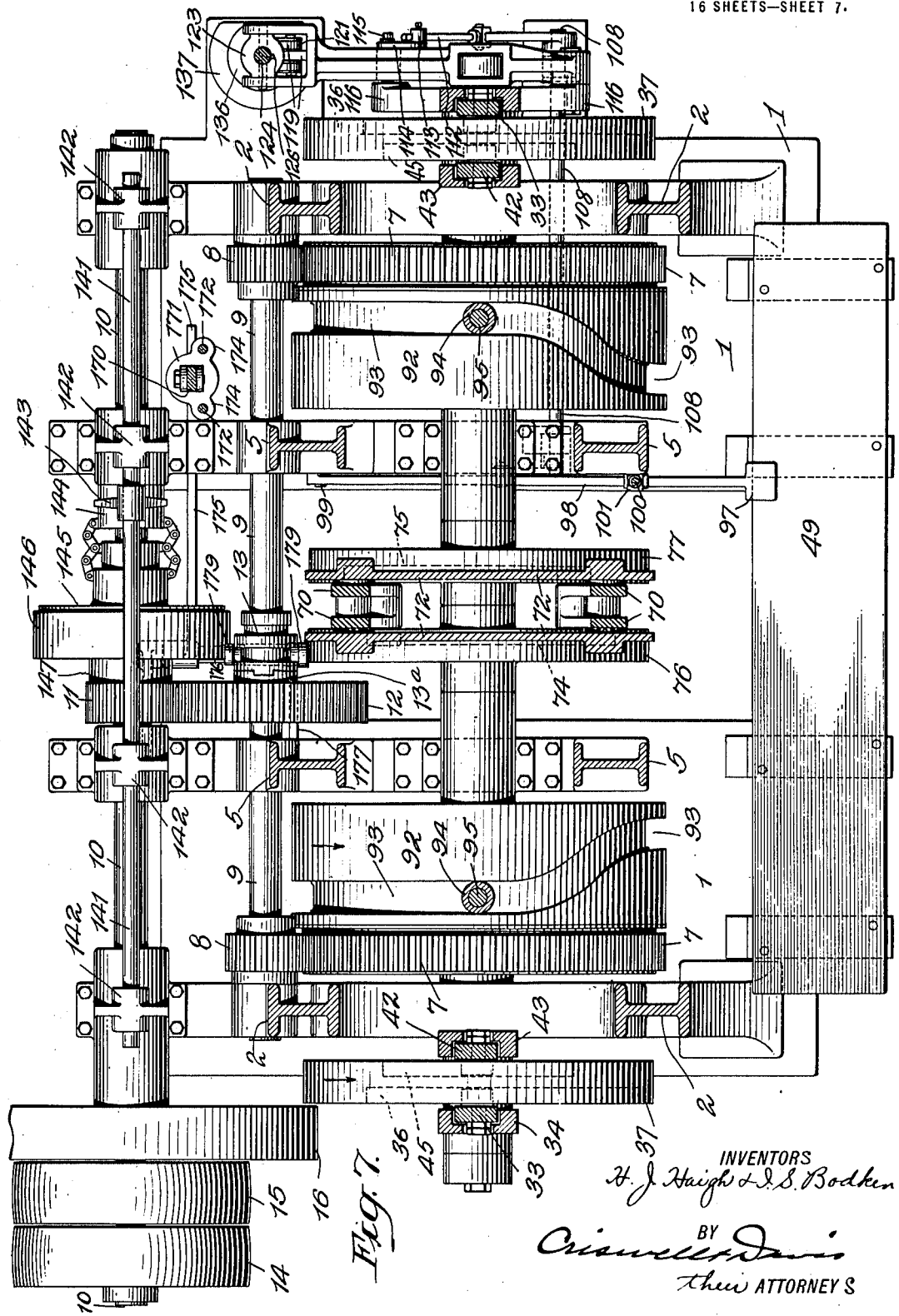

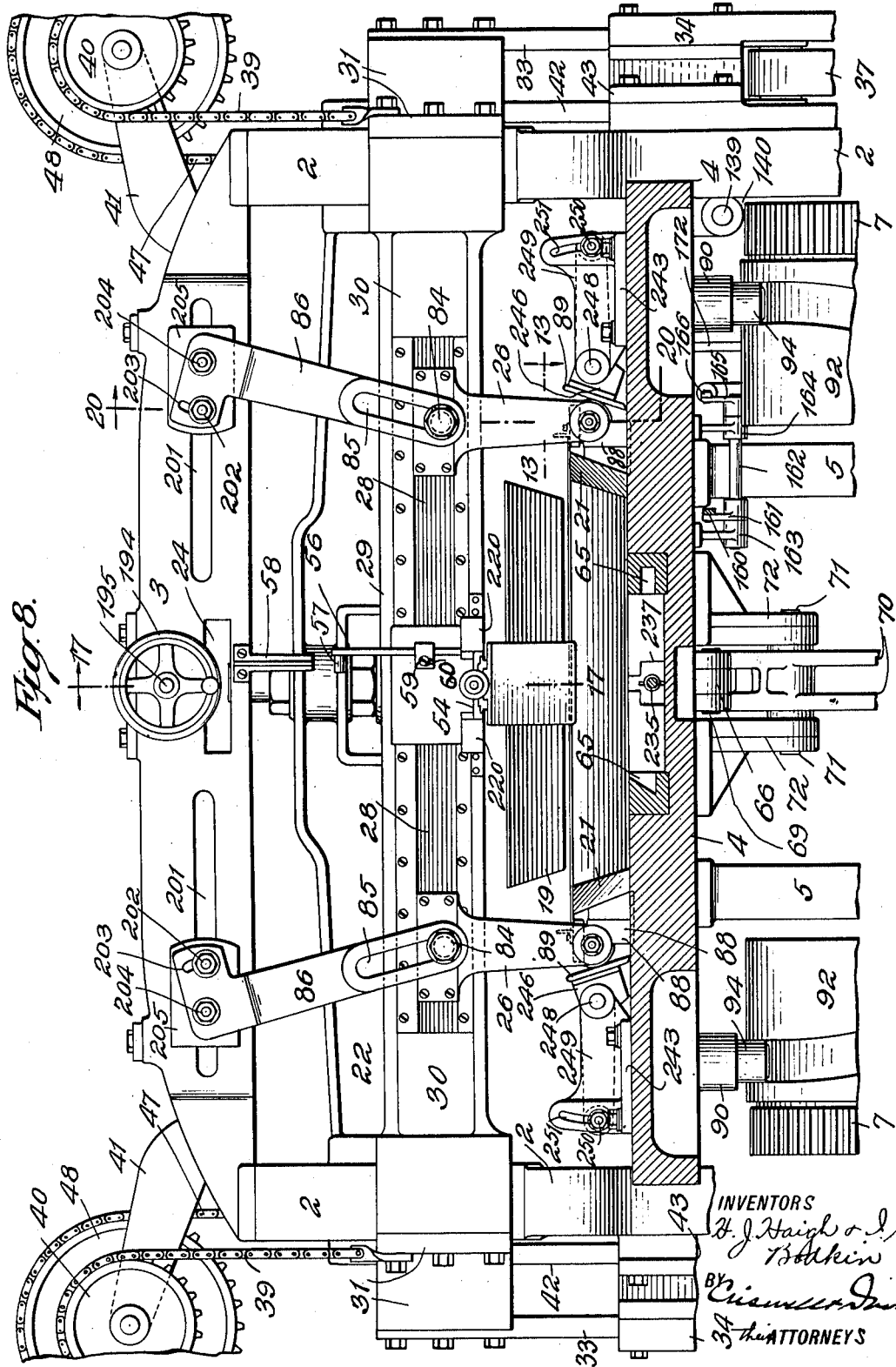

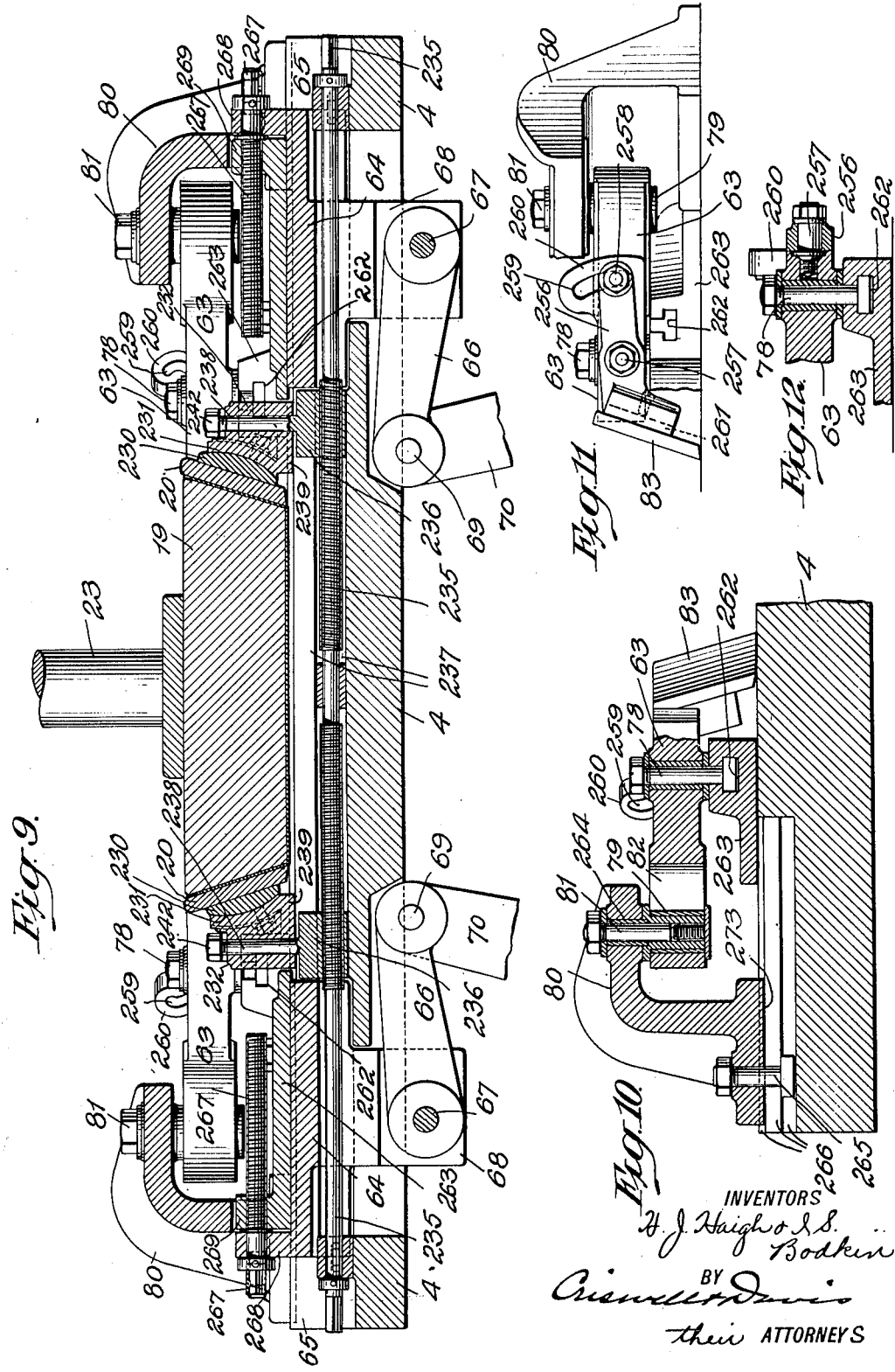

H. J. HAIGH & I. S. BODKIN.
MACHINE FOR MAKING BAKING PANS.
APPLICATION FILED NOV. 2, 1917.
1,270,816.
Patented July 2, 1918.
16 SHEETS—SHEET 10.
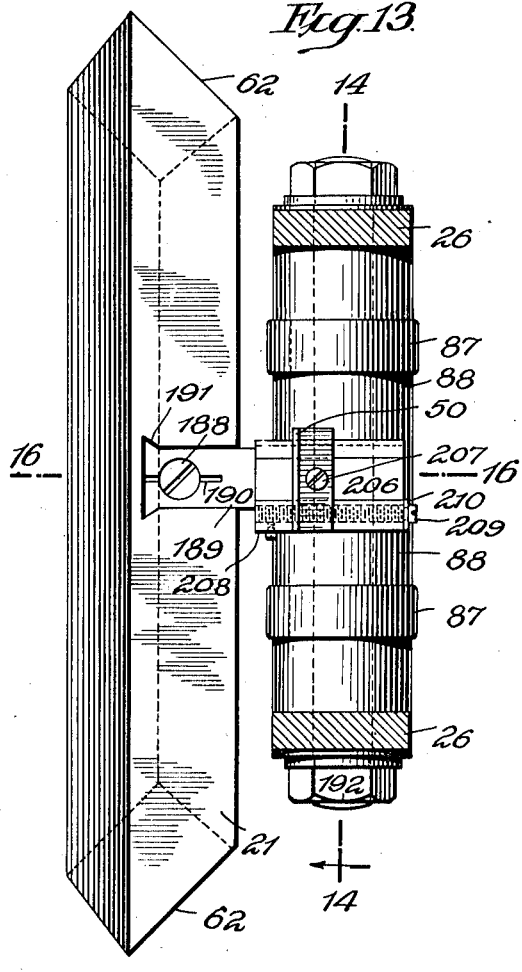
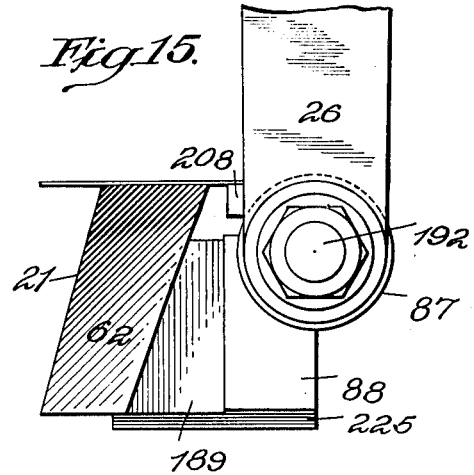
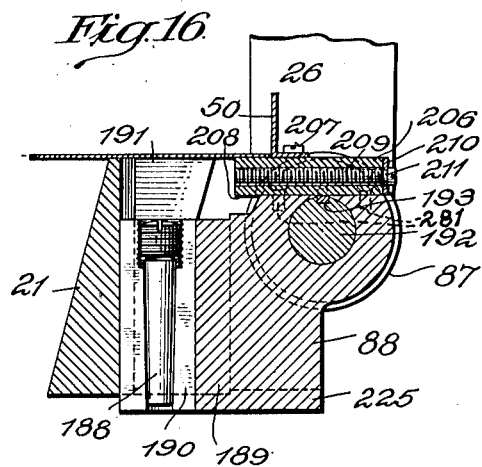
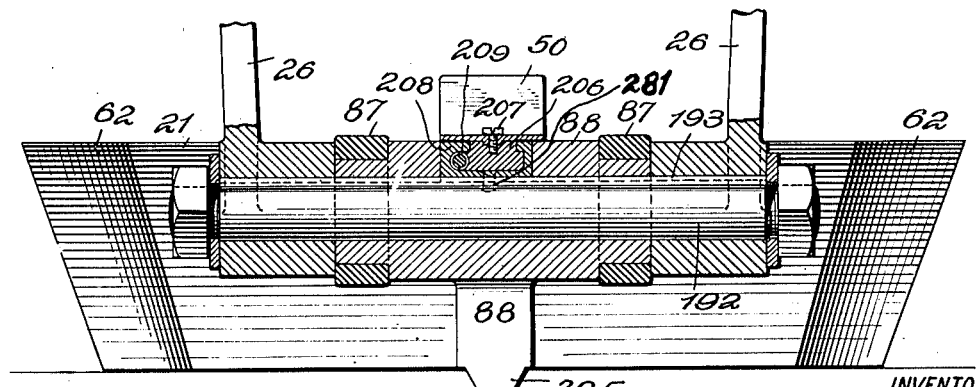
INVENTORS
H. J. Haigh & I. S. Bodkin,
BY
their ATTORNEYS

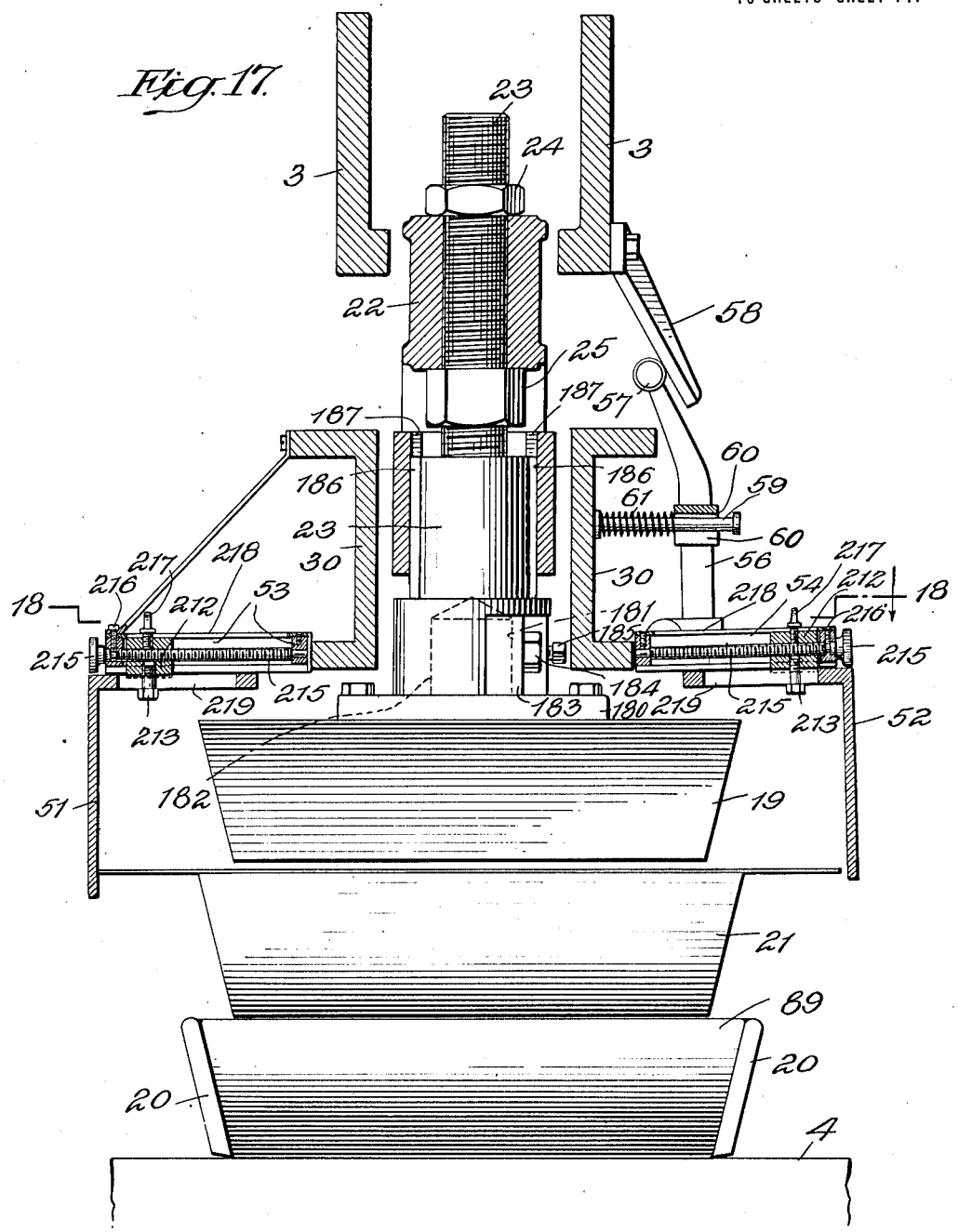

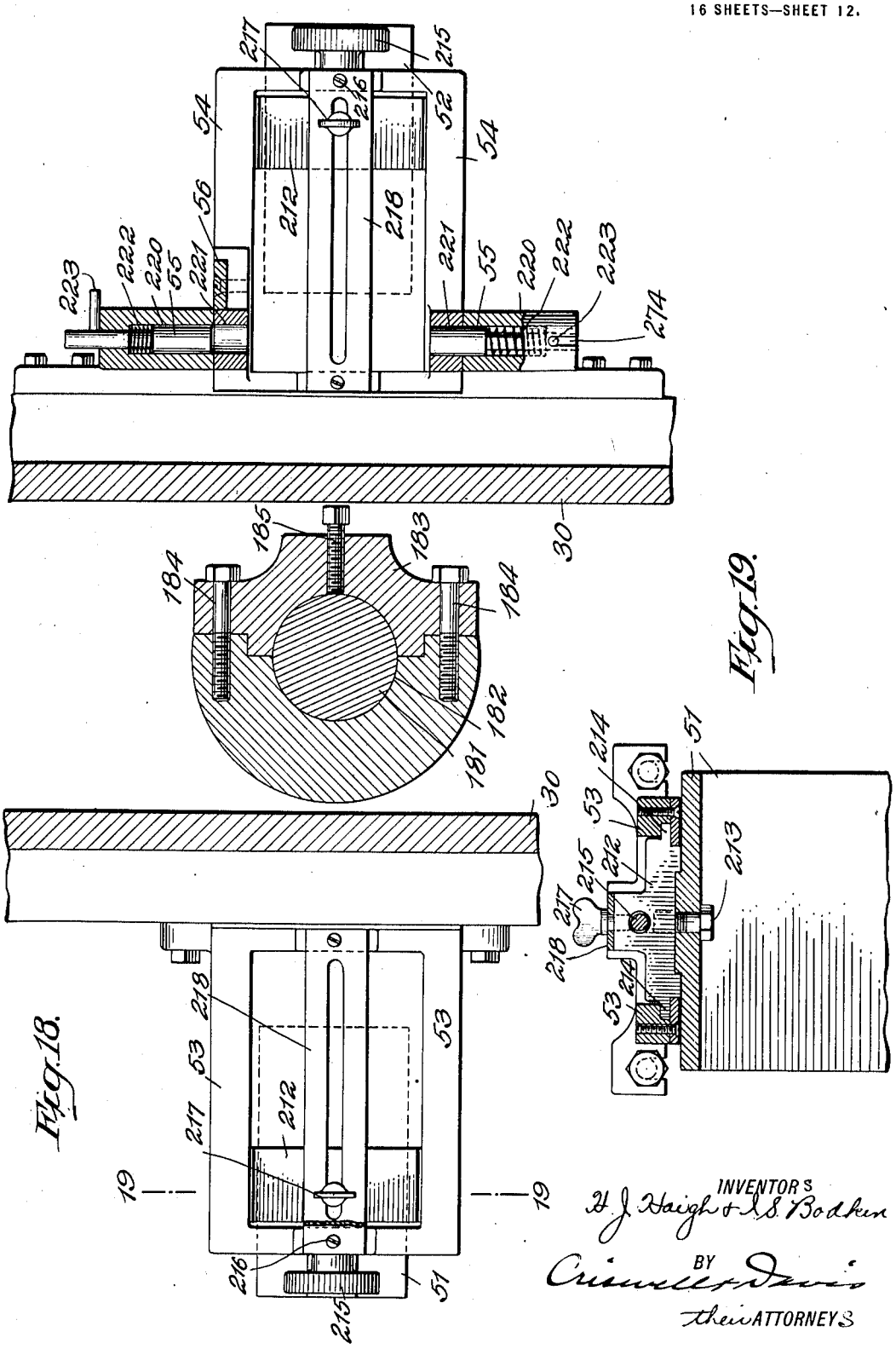

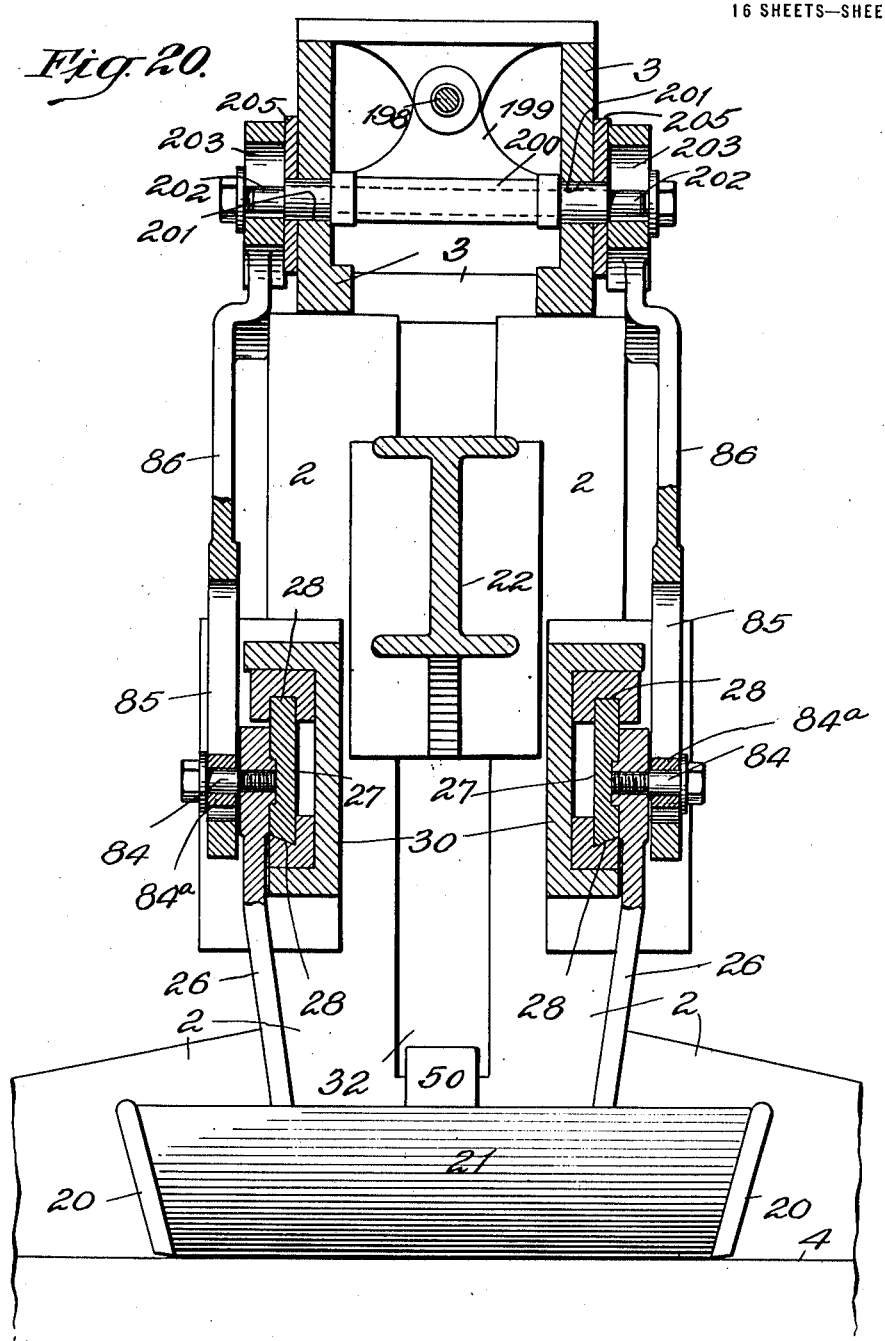

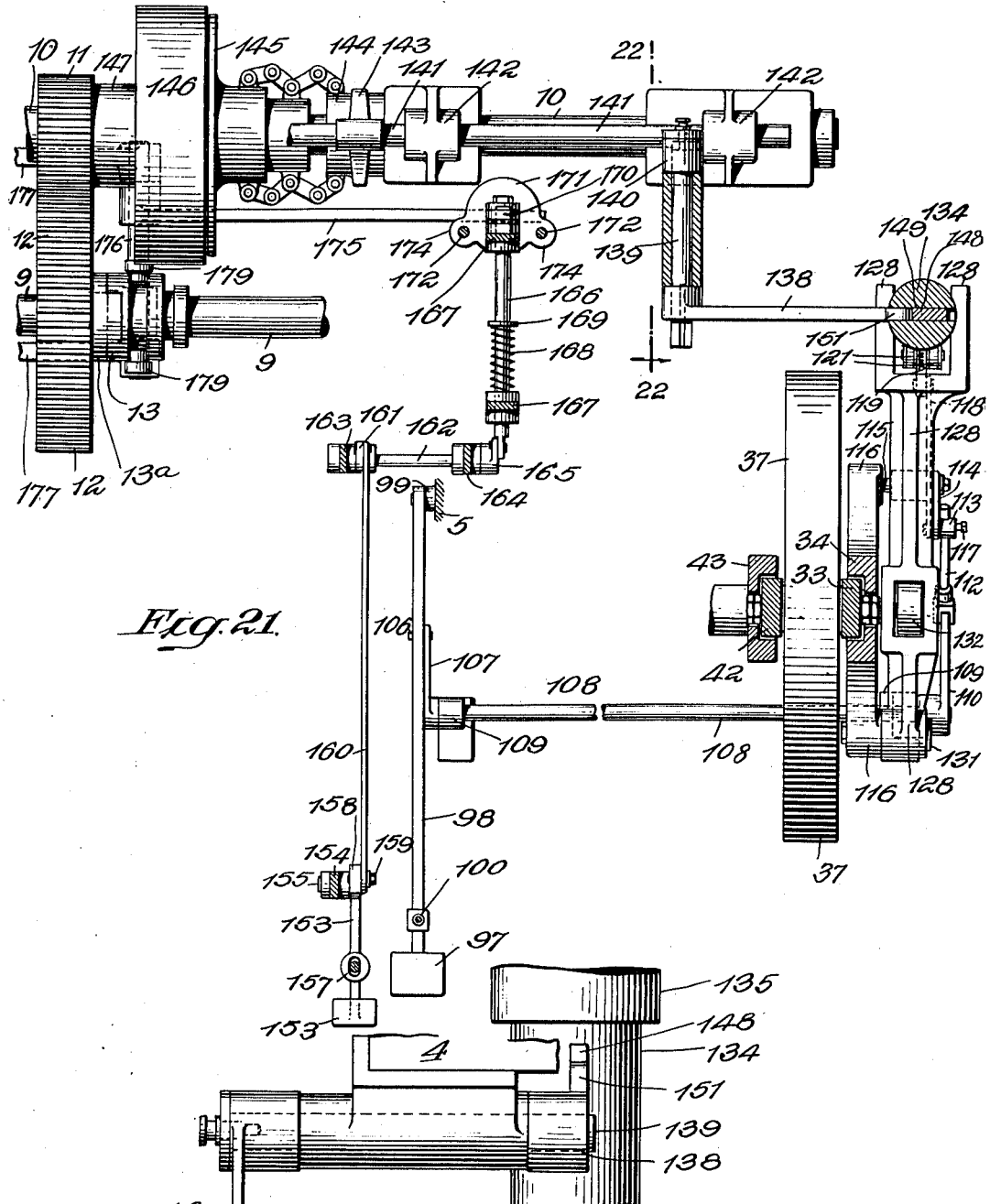

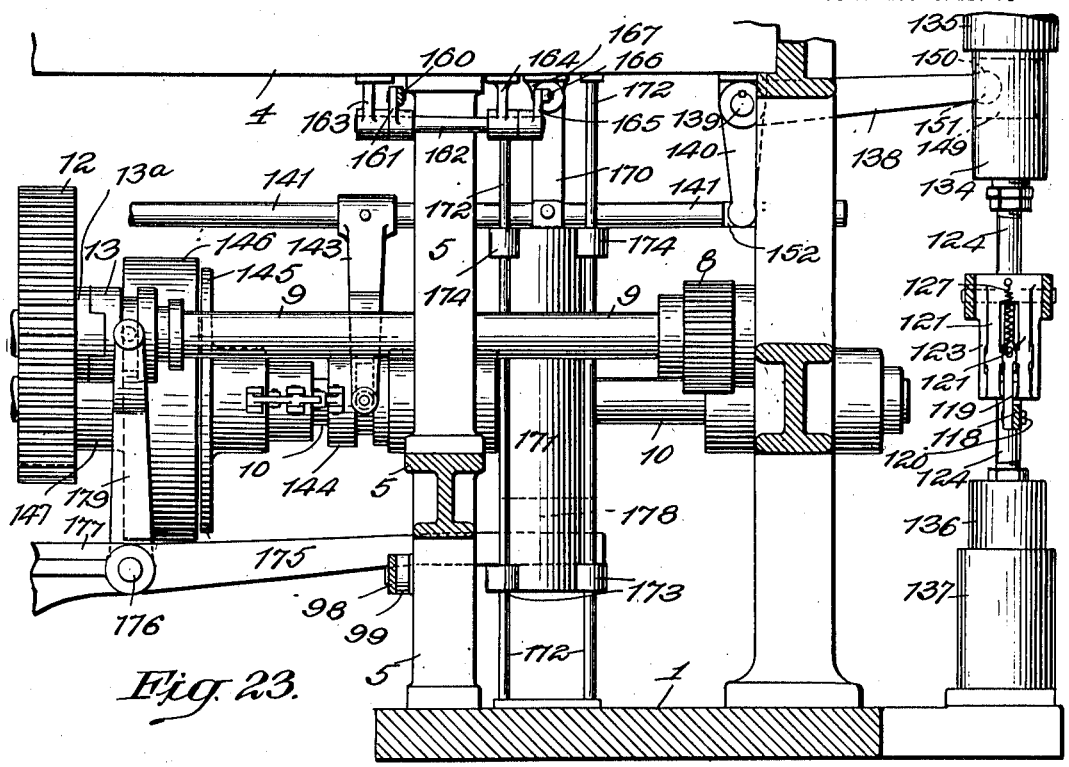

H. J. HAIGH & I. S. BODKIN.
MACHINE FOR MAKING BAKING PANS.
APPLICATION FILED NOV. 2, 1917.

1,270,816.

Patented July 2, 1918.
16 SHEETS—SHEET 16.

INVENTORS
H. J. Haigh & I. S. Bodkin
BY
Their ATTORNEYS

UNITED STATES PATENT OFFICE.

HARRY J. HAIGH, OF STAPLETON, AND IRVING S. BODKIN, OF NEW YORK, N. Y.; SAID BODKIN ASSIGNOR TO SAID HAIGH.

MACHINE FOR MAKING BAKING-PANS.

1,270,816.     Specification of Letters Patent.     Patented July 2, 1918.

Application filed November 2, 1917. Serial No. 199,917.

*To all whom it may concern:*

Be it known that we HARRY J. HAIGH, a citizen of the United States, and a resident of Stapleton, county of Richmond, city and State of New York, and IRVING S. BODKIN, a citizen of the Republic of Russia, and a resident of the borough of Bronx, county of Bronx, city and State of New York, have invented certain new and useful Improvements in Machines for Making Baking-Pans, of which the following is a specification.

This invention relates to machines for making pans or receptacles and is especially applicable for use in making sheet metal baking pans.

The principal object of the invention is to provide a machine adapted to stamp or fold the sides of a pan from a flat sheet metal blank and fold the surplus material at the corners of the pan flatly against the outer side of the pan.

Further important objects of the invention are to provide a machine of this character which shall be efficient in operation and may be operated by a single attendant; to provide a machine which may be readily adjusted and adapted to form pans of various sizes or pans having side walls of various inclinations; and to provide a machine which shall automatically perform a single cycle of operations to form a pan and come to rest with the parts in position to repeat the cycle of operations and form another pan.

In the drawings, Figure 1 is a front elevation of the machine;

Fig. 2 is a vertical longitudinal sectional view, taken on the line 2—2 of Fig. 3;

Fig. 3 is an end elevation looking toward the left of the machine, as shown in Fig. 1;

Fig. 4 is a vertical transverse sectional view on the line 4—4 of Fig. 2;

Fig. 5 is a horizontal sectional view on the line 5—5 of Fig. 1;

Fig. 6 is a view similar to Fig. 5, showing the parts in another position;

Fig. 7 is a horizontal sectional view on the line 7—7 of Fig. 1;

Fig. 8 is a fragmentary front elevation, partly in section, taken on the line 8—8 of Fig. 6;

Fig. 9 is a fragmentary vertical section on the line 9—9 of Fig. 6;

Fig. 10 is a fragmentary vertical sectional view on the line 10—10 of Fig. 6;

Fig. 11 is a detail side elevation of one of the devices for bending the surplus material around the corners of the pan;

Fig. 12 is a detail vertical sectional view on the line 12—12 of Fig. 6;

Fig. 13 is a detail view on the line 13—13 of Fig. 8;

Fig. 14 is a vertical section on the line 14—14 of Fig. 13;

Fig. 15 is a detail end elevation of the end-wall-forming block shown in Fig. 13;

Fig. 16 is a vertical section on the line 16—16 of Fig. 13;

Fig. 17 is a fragmentary vertical section on the line 17—17 of Fig. 8;

Fig. 18 is a fragmentary horizontal sectional view on the line 18—18 of Fig. 17;

Fig. 19 is a detail vertical section on the line 19—19 of Fig. 18;

Fig. 20 is a vertical sectional view on the line 20—20 of Fig. 8;

Fig. 21 is a fragmentary horizontal sectional plan taken below the table, some of the parts being omitted in order to more clearly show the automatic and emergency stop mechanisms;

Fig. 22 is a fragmentary vertical section on the line 22—22 of Fig. 21;

Fig. 23 is a fragmentary vertical sectional view showing the automatic and emergency stop mechanisms;

Fig. 24 is a detail view showing a portion of the starting and automatic stopping mechanism;

Fig. 25 is a detail vertical section on the line 25—25 of Fig. 26;

Fig. 26 is a detail horizontal section on the line 26—26 of Fig. 25;

Fig. 32 is a detail view showing the manner of mounting the side-wall bending plates on the table;

Fig. 33 is a detail view showing the inner face of one of the cams 37; and

Fig. 34 is a horizontal sectional view on the line 34—34 of Fig. 32.

Figure 1:
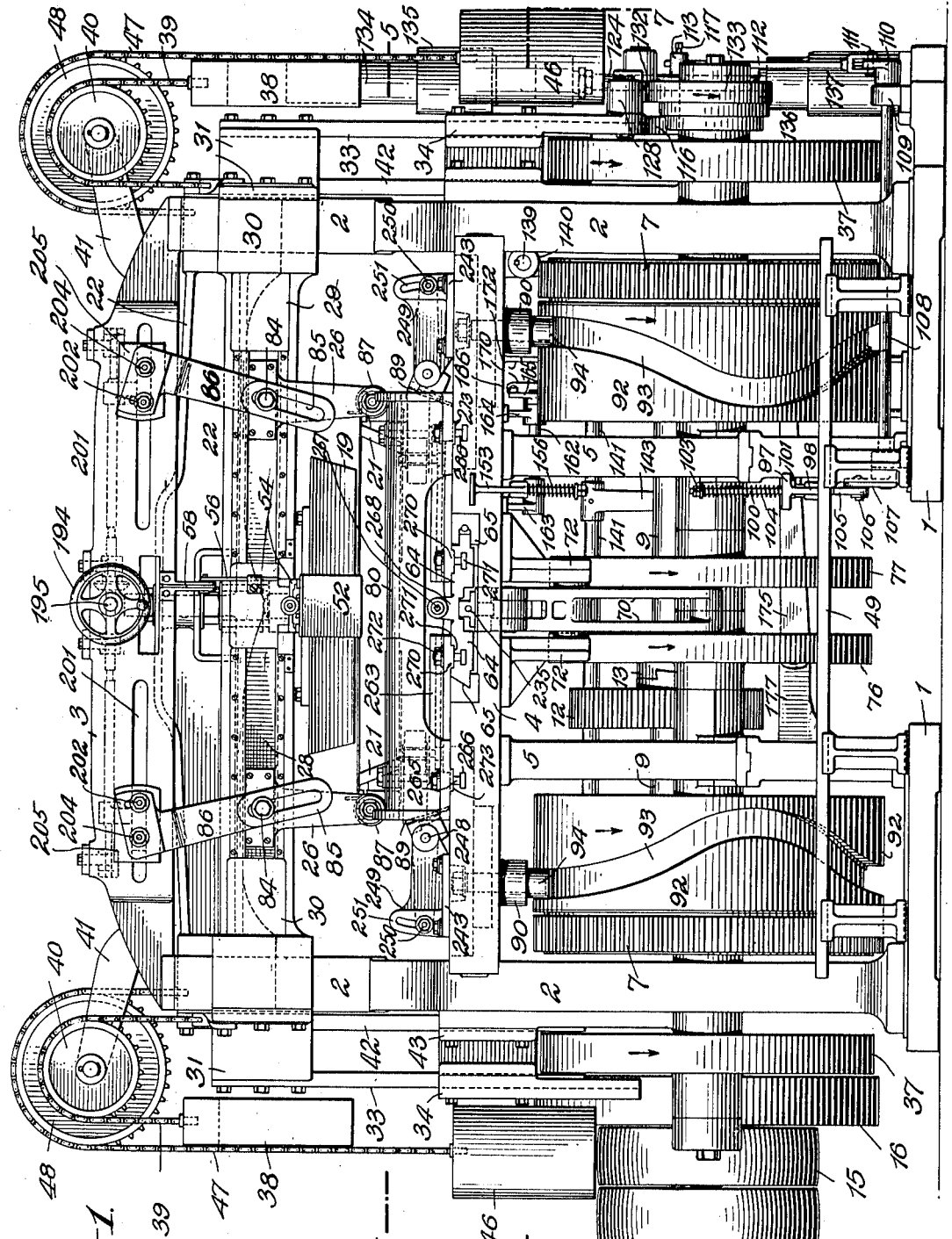

In the preferred embodiment of the invention shown in the drawings the machine comprises a main frame formed with base portions 1, end members 2 connected at their upper ends by a substantially channel shaped member or cross bar 3, and a bed or table 4 supported by the end members 2 and intermediate frame members 5. The several pan-forming devices are all driven from a cam-shaft 6 journaled in suitable bearings in the frame members 2 and 5. The shaft 6 is adapted to be rotated through one revolution at each operation through a pair of gear wheels 7 meshing with pinions 8 fixed on an intermediate shaft 9 journaled in bearings in the frame members 2 and 5. The shaft 9 is driven from a constantly running shaft 10, journaled in the frame, through a pinion 11 fixed to the hub 147 of the loose member 146 of a suitable friction clutch mounted on the shaft 10, a pinion 12 loosely mounted on the shaft 9, and a suitable clutch, one member 13ª of which is formed on the hub of pinion 12 and the other member 13 of which is slidably held to shaft 9 to rotate therewith, as more fully hereinafter described. The shaft 10 is adapted to be driven from any suitable source of power, being provided with the usual loose and fast pulleys 14 and 15 and a suitable fly-wheel 16.

Figure 27:
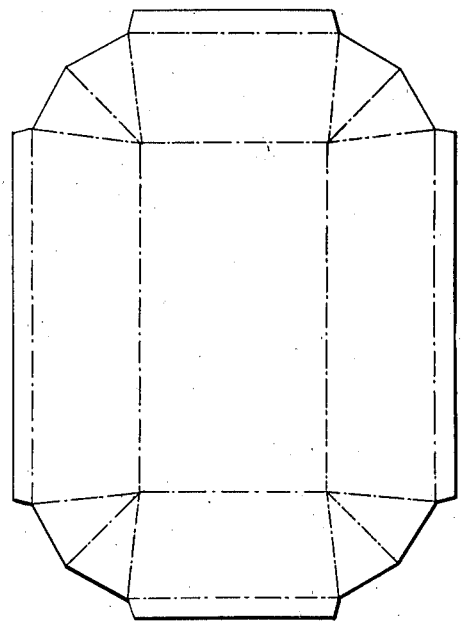
Fig. 27 is a plan view of one of the blanks from which the pans are formed.

The side walls 17 and the end walls 18 of the pan are bent or stamped up from the flat sheet metal blank shown in Fig. 27, by means of a vertically reciprocating male die member or block 19, which coöperates with a pair of side-wall forming members 20, adjustably held to the table or bed 4 in the manner and for the purpose hereinafter described, and a pair of end-wall forming members or blocks 21. The die block 19 is held to a vertically reciprocating cross-head 22, by means of a rod 23, the upper end of which is threaded and extends through an aperture in the cross-head 22, and is adjustably held to the cross-head 22 by means of suitable lock nuts 24 and 25. Each of the end-wall forming blocks 21 is detachably held to a bracket 88 supported between the lower ends of a pair of depending arms 26, the upper ends of which are fixed to blocks 27, slidably held in under-cut ways 28 formed in opposite sides of a vertically reciprocating cross-head 29. The cross-head 29 is formed of side members 30, connected at their ends by caps or cross members 31, forming a substantially rectangular structure which embraces and is guided vertically on the reduced upper portions of the end members 2, of the main frame. The cross-head 22 is shorter than the cross-head 29 and is guided at its ends in slots 32 in the end members 2 of the main frame, and is adapted to move vertically between the side members 30 and end members 31 of the cross-head 29. The cross-head 29 is adapted to be reciprocated vertically by means of rods 33, rigidly held at their upper ends to the end caps or cross bars 31 of the cross-head. The rods 33 extend through suitable bearings 34 held to the main frame, and are provided at their lower ends with rollers 35, operating in cam grooves 36 formed in the outer faces of cams 37 mounted on the cam shaft 6. The cross-head 29 is provided with counter-balancing weights 38, connected thereto by means of suitable sprocket chains 39, passing over sprocket wheel 40, journaled in the outer ends of brackets 41 held to the top cross member 3 of the main frame. The cross-head 22 is reciprocated vertically by means of rods 42, guided in bearings 43 on the main frame, and provided at their lower ends with rollers 44 working in cam grooves 45 formed in the inner faces of the cams 37. The cross-head 22 moves substantially twice as far as the cross-head 29, and the cam grooves 45 in the cams 37 are so shaped as to have substantially twice the throw of the cam grooves 36. The cross-head 22 is provided with suitable counter-balancing weights 46 connected therewith by sprocket chains 47 passing over sprocket wheels 48 journaled in the outer ends of the brackets 41 on the top cross member 3 of the main frame.

In Figs. 1 to 5, the parts of the machine are shown in the positions assumed when the machine is at rest and ready to begin the performance of the cycle of operations carried out in the formation of a pan. Each pan is formed from a flat metal blank previously cut or stamped from a sheet of material to the form shown in Fig. 27. The operator stands at the front of the machine on a suitable platform 49, and places the sheet metal blank in the machine in the position shown in Figs. 1, 2 and 4, upon the upper edges of the end wall-forming blocks 21, between the centering gages 50 adjustably held to the brackets 88 which support the end blocks 21. The blank is pushed rearwardly between the gages 50 until the rear edge thereof abuts against a depending gage plate 51 adjustably held to a frame or bracket 53 fixed to the rear side member 30 of the cross-head 29, as shown more clearly in Figs. 17 and 18.

When the parts are in starting position, as shown in Figs. 1 and 2, the gages 50 are a greater distance apart than the length of the blank, and when the cross-head 29 moves downwardly the brackets 88 which support the blocks 21 and gages 50 are moved downwardly and inwardly toward each other until the blocks 21 engage the table 4, as shown in Fig. 8. This downward and inward movement of the brackets 88 causes the gages 50 to move toward each other into engagement with the end edges of the blank and thus center the blank with relation to the die members, the gages 50 being spaced apart a distance equal to the length of the blank when the parts reach the position shown in Fig. 8. The downward and inward movement of the blocks 21 and gages 50 is imparted thereto by means of bolts 84 carried by the upper ends of the arms 26 which support the brackets 88. The bolts 84 are provided with suitable anti-friction rollers 84ª, and extend through slots 85 formed in the lower ends of two pairs of inclined arms 86 which are held at their upper ends at opposite sides of the top cross member 3 of the main frame. As the cross-head 29 moves downwardly it will be obvious that bolts 84 will pass downwardly along the inclined slots 85 in arms 86, and will move the sliding blocks 27 to which the arms 26 are held inwardly toward each other along the ways 28 formed in the side members 30 of cross-head 29, thus causing the brackets 88 and blocks 21 to move downwardly and inwardly toward each other and causing the gages 50 to approach each other and center the blank.

Coöperating with the gages 50 and gage plate 51 to accurately center the blank is a depending gage plate 52 pivotally held to the front member 30 of the cross-head 29. The pivoted gage plate 52 is held in a raised position when the machine is at rest, as shown more clearly in Fig. 17, and has a downward and inward movement to assist in centering the blank. Referring particularly to Figs. 4, 8, 17 and 18, the gage plate 52 is adjustably held to a frame 54, which is connected with the front member 30 of the cross-head 29 by horizontal pivot pins 55. The frame 54 is automatically rocked upwardly and held in raised position when the machine comes to rest by means of an upwardly extending arm 56, rigidly held to the frame and provided at its upper end with a suitable roll 57, adapted to engage under a depending cam arm 58, held to the top cross member 3 of the main frame. When the cross-head 29 begins its downward movement after the machine is started the roll 57 will move downwardly and outwardly, and the frame 54 and gage plate 52 will move downwardly and inwardly until the frame 54 is in horizontal position and the plate 52 is in a vertical position with its lower edge in front of the forward edge of the blank. As the plate 52 moves downwardly and inwardly in an arc of a circle until it assumes the vertical position just described, it will force the blank into close engagement with the rear gage plate 51 and thus insure accurate centering of the blank between the gages 50, 51 and 52. The downward movement of the frame 54 and gage plate 52 is limited by means of a suitable headed stop rod 59, the shank of which passes loosely through an open-ended slot 60 formed in an offset portion of the arm 56, and is held to the front member 30 of the cross-head 29. A suitable coil spring 61 is provided for normally forcing the arm 56 outwardly.

The cross-heads 22 and 29 move downwardly in unison until the lower edges of the end-wall forming blocks 21 engage the top of the table 4, as shown in Fig. 8, whereupon the cross-head 29 ceases to move. The downward movement of the cross-head 29 imparts a downward and inward movement, as heretofore described, to the end-wall forming blocks 21, and causes said blocks to assume the position shown in Figs. 6 and 8, in which position the blocks 21 and the side-wall forming plates 20 form a rectangular female die. As shown more clearly in Fig. 6, it will be observed that the ends of the members 20 and 21 are spaced slightly apart at the corners to provide a space through which the surplus material in the blank may be pressed by the male die member 19.

Figure 28:
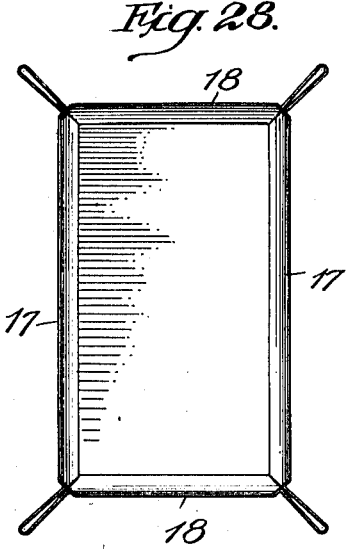
Fig. 28 is a plan view showing a partly formed pan.

After the cross-head 29 comes to rest with the end-forming members in the position just described, the cross-head 22 continues its downward movement, forcing the male die member 19 downwardly within the female die member formed by the side-wall forming plates 20 and the end-wall forming blocks 21, as shown in Figs. 6 and 9, pressing the blank into the form shown in Fig. 28, with the folds of surplus material extending radially through the openings heretofore described between the ends of the members 20 and 21. At this point the cross-head 22 comes to rest and the radially extending folds of surplus material are bent against the beveled ends 62 of the end-wall forming blocks 21, at which time the blank is pressed to the form shown in Fig. 29.

Figure 29:
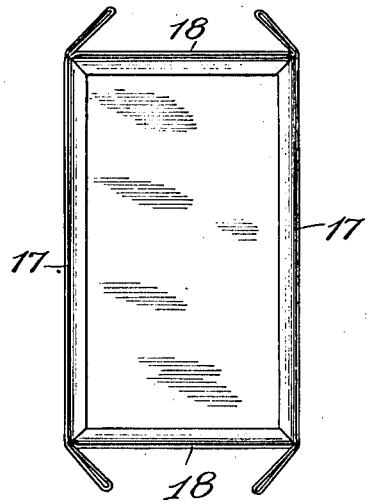
Fig. 29 is a plan view showing the form given the pan at the next operation.

The radially extending folds of surplus material are bent to the position shown in Fig. 29 against the beveled ends 62 of the block 21, by means of two pairs of corner-fold benders 63. One pair of corner-fold benders 63 is carried by a horizontally reciprocable slide 64 mounted in a suitable guide-way 65, at the rear of the table 4, and the other pair of benders 63 is carried by a similar horizontally reciprocable slide 64 mounted in a similar guide-way 65 at the front of the table 4. The slides 64 are moved toward and from each other by means of links 66 pivotally held at their outer ends at 67 to depending arms or brackets 68 carried by the slides 64 and pivotally connected at their inner ends at 69 to the upper ends of levers 70. The levers 70 are pivotally supported intermediate their ends on horizontal pivots 71 fixed in brackets 72 depending from the table 4, and are provided at their lower ends with rollers 73. The roller 73 on one of the levers 70 operates in a cam groove 74, and the roller 73 on the other lever 70 operates in a cam groove 75, formed in the adjacent faces of two rotary cam disks 76 and 77 fixed on the cam shaft 6. The cam grooves 74 and 75 in the disks 76 and 77 are so shaped as to move the slides 64 toward and from each other, and are timed to move the slides 64 inwardly toward each other after the cross-head 22 comes to rest with the die block 19 in the position shown in Figs. 6 and 9. When the slides 64 are moved inwardly toward each other the corner-fold benders 63 move inwardly with the slides, and at the same time are rocked outwardly about the vertically extending pivot bolts 78, by means of which the benders are held to plates 263 adjustably supported on the slides 64. This pivotal movement is imparted to the benders by means of rolls 79 held to upwardly and inwardly extending brackets 80, by means of suitable clamping bolts 81, and working in arcuate slots 82 in the corner-fold benders 63. This compound movement imparted to the benders 63 causes the inclined heads 83 thereof to move diagonally across the corners of the female die formed by the members 20 and 21 on a line parallel with the beveled ends 62 of the end-wall forming blocks 21, and results in bending the radially extending folds of surplus material shown in Fig. 28, flatly against the beveled ends 62 of the blocks 21, causing the blank to assure the form shown in Fig. 29.

A continued rotation of the cam shaft 6 causes the levers 70 to move slides 64 outwardly away from each other, thus returning the benders 63 to their normal position, where they remain until again brought into action at the proper time in a subsequent cycle of operations to form another pan. At this time the cross-head 29 is raised by the arms 33 and cams 37 until it reaches the position shown in Figs. 1 and 2, in which position it remains until the machine is actuated to repeat the cycle of operations for forming another pan. The cross-head 22 remains stationary at this time, holding the die block 19 within the partially formed pan in the position shown in Figs. 6 and 9. When the cross-head 29 moves upwardly it carries with it the end-wall forming blocks 21. By reason of the inclination of the ends of the partially formed pan, it is necessary that the end-wall forming blocks 21 shall have an upward and outward movement imparted thereto when the cross-head 29 is returned to its normal position. This upward and outward movement is imparted to the blocks 21 by means of the bolts 84, carried by the upper ends of the arms 26 and extending outwardly through slots 85 formed in the lower ends of the inclined arms 86, which are adjustably held at their upper ends at opposite sides of the top cross member 3 of the main frame. The bolts 84 are provided with suitable anti-friction rolls 84ª, Fig. 20. As the cross-head 29 moves upwardly it will be obvious that the bolts 84 and rolls 84ª will pass upwardly and outwardly along the slots 85 in the arms 86, and will move the sliding blocks 27 to which the upper ends of the arms 26 are fixed outwardly along the ways 28 formed in the side members 30 of the cross-head 29, thus causing the blocks 21 to move upwardly and outwardly on lines parallel with the inclined end walls of the partially formed pan. The end-wall forming blocks 21 when in their lowered position are braced against outward pressure by reason of the engagement of rolls 87, journaled on the brackets 88 which support the blocks 21, with the faces of the corner-fold flattening plates 89, as shown more clearly in Figs. 6 and 8.

Figure 30:
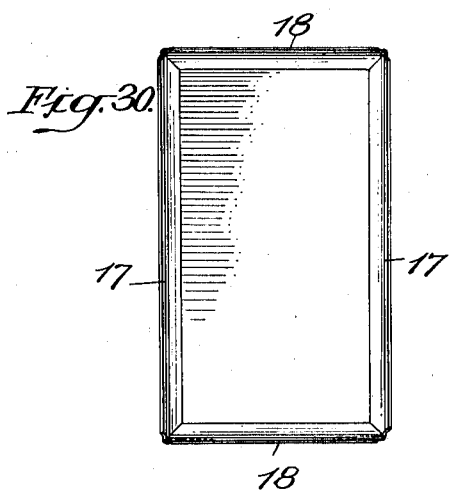
Fig. 30 is a plan view showing the form of the pan after the final operation.
Figure 31:
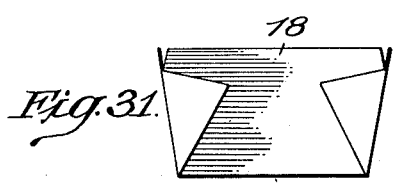
Fig. 31 is an end view of the pan shown in Fig. 30.

After the end-wall forming blocks 21 have been lifted upwardly and outwardly by the cross-head 29 in the manner just described, the partly bent corner folds shown in Fig. 9 are flattened against the end walls 18 of the pan by means of the reciprocating corner-fold flattening plates 89 which at this time are moved inwardly toward each other to press the corner folds closely against the end walls of the pan, and are then returned to their normal position. The corner-fold flattening plates 89 are adjustably held to slides 90 working in suitable ways or grooves formed at the sides of openings 91 formed in the table 4. The slides 90 are operated at the proper time by means of cam drums 92 fixed on the cam shaft 6 and provided with suitably formed cam grooves 93 in which rolls 94, held to the slides 90 by bolts 95, are adapted to operate. The gear wheels 7 which drive the cam shaft 6 are mounted on the hubs of the cam drums 92 and are held to the cam drums by bolts 96. The cams 37, 77, and 92 are all keyed to the cam shaft 6 to rotate therewith, as shown more clearly in Fig. 2. After the corner-fold flattening plates 89 are returned to their normal position the cross-head 22 is raised by the action of the cams 37 and returned to its normal position, whereupon the clutch members 13 and 13ª are automatically disconnected, by mechanism hereinafter more fully described, and the shaft 9 and cam shaft 6 cease to rotate and the machine comes to rest with all the parts in position to repeat the cycle of operations above described. The pan, which has been formed as shown in Figs. 30 and 31, may then be removed from the machine and a similar pan formed in the manner above described.

The mechanism for starting the machine and for automatically stopping the same after the cam shaft 6 has been rotated through one revolution is shown more particularly in Figs. 1 to 5, Fig. 7, and Figs. 21, 22, 23, 25 and 26. After placing a sheet metal blank in the machine in the manner heretofore described, the operator starts the machine by depressing a treadle 97, carried by the outer end of a lever 98, which is pivotally held at its rear end to a horizontally extending stud 99, formed on one of the main frame members 5. The lever 98 is normally held in raised position by means of a rod 100 extending upwardly through an apertured lug 101 formed on the frame member 5, and said rod is pivotally held at its lower end by a pin 102 to the lever 98. A suitable collar 103 is held to the rod 100 adjacent the upper end of said rod, and a coil spring 104 is mounted on the rod between the lug 101 on the frame member 5 and the collar 103 carried by the rod 100. The spring 104 is compressed when the treadle 97 is depressed, and serves to automatically return the treadle when the pressure of the operator's foot thereon is relieved.

The lever 98 is provided with a depending portion or lug 105, intermediate its ends, having a pin-and-slot connection 106 with a rock arm 107 fixed to one end of a rock shaft 108 which is journaled in suitable bearings 109 on the base 1 of the main frame. A rock arm 110 is fixed to the outer end of the rock shaft 108, and is connected by a horizontal pivot pin 111 with the lower end of a link 112. The upper end of the link 112 extends through an aperture in a boss 113 formed on one arm of a bell-crank lever 114, pivotally held at 115 to a bracket 116 depending from and preferably formed integrally with the slide-bearing cap 34. The upper end of the link 112 is adjustably held in the boss 113 on the bell-crank lever 114 by means of a suitable locking screw 117. The bell-crank lever 114 is connected with the forward end of a link 118, by means of a pin 119 which extends through a slot in the forward end of said link. The rear end of the link 118 is connected with the lower end of a pawl 119 by means of a pivot pin 120. The pawl 119 is pivotally held intermediate its ends between two forwardly extending ears 121 formed at opposite sides of a slot 122 in a sleeve 123 which is slidably mounted on a vertically extending rod 124. The pawl 119 is held to the ears 121 by a horizontal pivot pin 125, and the upper end of the pawl is normally held by means of a suitable spring 127 beneath the lower end of a vertically extending key 126 held to the rod 124. The slidable sleeve 123 is connected with the forked rear end of a lever 128, by means of a pair of horizontally extending pins 129 extending through slots 130 in the forked end of said lever. The lever 128 is pivotally held at its forward end to a stud 131 formed on the bracket 116. A roller 132 is rotatably held to the lever 128 intermediate the ends of said lever, and rides upon the periphery of a cam 133 keyed to the cam shaft 6. A cylindrical weight 134 is fixed on the upper end of the rod 124, and is slidably guided in the outer end of a bracket 135 held to the main frame. A cylindrical weight 136 is held to the lower end of the rod 124, and works in a suitable dash-pot 137 supported on the base 1 of the main frame.

The weights 134 and 136 and the shaft 124 are normally held in raised position, as shown in the drawings, by the pawl 119, which engages under the key 126 carried by the shaft 124, and said pawl 119 is held in raised position by the engagement of the high portion of the cam 133 under the roller 132 carried by the lever 128. When the treadle 97 is depressed the pawl 119 will be shifted from beneath the key or projection 126 on the rod 124, through the connections above described, permitting said rod with the weights 134 and 136 to drop, the downward movement of the weights being cushioned by the action of the lower weight 136 in the dashpot 137. When the weights drop, a rock arm 138 fixed to a rock shaft 139 at one end, and having a sliding and rocking connection with the weight 134 at its opposite end, is depressed, causing a depending rock arm 140 fixed to the rock shaft 139 to shift a horizontally slidable rod 141, guided in suitable bearings 142 on the frame members 2 and 5, toward the left-hand side of the machine. A clutch-shifting fork 143 is fixed at its upper end to the horizontally slidable rod 141, and is connected at its lower end in the usual manner with a clutch collar 144 which is slidably mounted on the shaft 10 and operatively connected to shift the male member 145 of a suitable friction clutch into engagement with the female member 146 of said clutch when the rod 141 is forced toward the left-hand side of the machine, in the manner just described. The clutch collar 144 and clutch member 145 are slidably mounted on the constantly running power shaft 10, and are held to said shaft to rotate therewith in the well-known manner. It will be seen therefore, that when the clutch member 145 is shifted into engagement with the clutch member 146 in the manner just described, the loose clutch member 146 will be caused to rotate with the shaft 10. As the loose pinion 11 is formed integrally with or otherwise held to the hub 147 of the clutch member 146, said pinion will rotate with the clutch member and will drive the cam shaft 6 through the medium of the pinion 12, clutch 13, shaft 9, and the pinions 7 and 8, as heretofore described. The two members of the clutch 13 are normally held in engagement and are only disconnected in emergencies, as hereinafter described. The sliding and rocking connection between the rock arm 138 and the weight 134 comprises a plate 148, having a limited sliding movement in a slot 149 extending transversely through the weight 134. The plate 148 is formed with a socket 150 in which the rounded end 151 of the rock arm 138 is held. The lower end of the rock arm 140 engages in a recess or cut-away portion 152 in one side of the horizontally slidable rod 141.

When the machine is started in the manner above described, the cam shaft 6 is slowly rotated through one complete revolution and the clutch member 145 is then disconnected from the clutch member 146 to stop the machine. As the cam shaft 6 rotates the cam 133 will rotate therewith, and the high point of the cam 133 (see Fig. 3) will be moved out of contact with the roller 132 on the lever 128, permitting the outer end of said lever, which supports the sliding sleeve 123 and the pawl 119, to move downwardly as the lower part of the cam passes under roller 132 until the upper end of the pawl again engages beneath the lower end of the key or projection 126 on the shaft 124. As the cam shaft 6 approaches the end of its revolution the high point of the cam 133 will again be brought beneath the roller 132, whereupon the outer end of the lever 128 will be lifted, carrying with it the sliding sleeve 123 and the pawl 119 and, as the pawl 119 is locked beneath the key 126 on the rod 124, the rod 124 with the weights 134 and 136 will be elevated until they are again restored to normal position. As the rock arm 138 is connected to the weight 134, as heretofore described, it will be obvious that when the weight 134 is elevated the horizontally sliding rod 141 will be moved toward the right-hand side of the machine through the connection heretofore described, thus causing the clutch fork 143 to disconnect the clutch member 145 from the clutch member 146 and stop the machine, with the parts in position to repeat the cycle of operations heretofore described.

To enable the operator to instantly stop the machine at any time in an emergency, we have provided an emergency or safety stop mechanism, which is shown more particularly in Figs. 1 to 4, 7, 8, 21, 23 and 24. The emergency stop mechanism is actuated by means of a hand lever 153 located adjacent the front edge of the table 4 in convenient reach of the operator. The rear end of the lever 153 is held to a bracket 154, depending from the table 4, by a horizontal pivot pin 155. The lever 153 is normally held in raised position by means of a coil spring 156 held on a depending rod 157 which is fixed at its upper end to the table 4 and passes through an aperture in the lever 153. The lever 153 is formed with an upwardly extending rock arm 158 at its rear end, which is pivotally connected at 159 with the forward end of a link 160. The link 160 is pivotally connected at its rear end with the upper end of a rock arm 161 held to one end of a rock shaft 162 which is journaled in brackets 163 and 164 depending from the table 4. A rock arm 165 is held to the opposite end of the rock shaft 162, and is pivotally connected at its upper end with the forward end of a horizontally extending rod 166, slidably mounted in a pair of brackets 167 depending from the table 4. The horizontally slidable rod 166 is normally held in a rearwardly extended position, as shown in Figs. 21 and 24, by means of a coil spring 168 mounted on said rod and interposed between the forward bracket 167 and a collar 169 fixed on the rod. When the rod 166 is in its normal position the rear end thereof extends through an aperture in the upper end of a bar 170 from the lower end of which a heavy weight 171 is suspended in an elevated position, as shown more clearly in Figs. 23 and 24. The weight 171 is slidably held to a pair of vertical guide rods 172 which extend through apertures in a pair of lugs or ears 173 formed on the weight 171 adjacent the lower end thereof, and through apertures in a pair of lugs or ears 174 formed on the weight 171 adjacent the upper end thereof. The guide rods 172 are held to the base 1 of the main frame at their lower ends, and are held to the table 4 at their upper ends.

When the hand lever 153 is depressed by the operator the machine will be immediately stopped in whatever position the parts may be at the time. The depression of the lever 153 causes the rear end of the rod 166 to be withdrawn from the aperture in the upper end of the bar 170, through the connections above described, whereupon the weight 171 drops downwardly and depresses the free end of a lever 175 which is held to a rock shaft 176 journaled at its ends in a pair of brackets or arms 177 extending horizontally from one of the main frame members 5. The free end of the lever 175 extends through a slot 178 extending transversely through the lower end of the weight 171. The slot 178 is preferably formed so that the upper edge thereof is spaced some distance above the upper edge of the lever 175, so that when the weight 171 drops it will gain some momentum before the upper edge of the slot strikes the upper edge of the lever 175. The lever 175 will thus be quickly and forcibly depressed, rocking the shaft 176 in its bearings and, through said shaft 176, rocking the clutch fork 179 toward the right-hand side of the machine. The clutch fork 179 is held at its lower end to the rock shaft 176, and the forked upper end thereof engages a groove in the driving member of the clutch 13, and is adapted to shift said fixed or driving member of the clutch 13 longitudinally of the shaft 9 in the usual manner to disconnect said member from the loose or driven member 13ª of the clutch when the lever 175 is depressed, as above described. The loose member 13ª of the clutch 13 is formed integrally with or otherwise fixed to the hub of the loose pulley 12, which is mounted on the shaft 9. It will be seen, therefore, that when the operator in case of emergency depresses the lever 153, the two members of the clutch 13 will be disconnected thus interrupting the driving connection between the constantly running shaft 10 and the shaft 9, whereupon the cam shaft 6 will cease to rotate, and the machine will immediately come to rest.

To start the machine and cause the same to complete the cycle of operations after the machine has been stopped in any position by the safety mechanism just described, the operator first shifts the driving belt (not shown) from the fast pulley 15 to the loose pulley 14, by suitable belt shifting mechanism, not shown, whereupon the driving shaft 10 will cease to rotate. The operator then elevates the weight 171 and passes the rear end of the sliding rod 166 through the aperture in the upper end of the bar 170 from which the weight is suspended. When the weight 171 is raised the free end of lever 175 will also be raised, thus rocking shaft 176 and shifting the clutch fork 179 toward the left-hand side of the machine and moving the sliding member of the clutch 13 into engagement with the other member 13ª of said clutch. The driving belt may then be shifted from the loose pulley 14 to the fast pulley 15 and, as the clutch members 145 and 146 remain in engagement when the machine is stopped by the emergency stop mechanism, it will be obvious that when the weight 171 is again suspended from the rod 166 and the driving belt is shifted to the fast pulley 15 the driving connection between the shaft 10 and cam shaft 6 will be restored, and the cam shaft will be rotated through the remainder of its revolution, whereupon it will be stopped by the automatic stop mechanism controlled by the cam 133, and heretofore described.

To adapt the machine to form pans of various sizes and having walls inclined at various angles, the die block 19 is detachably held to the plunger 23 so that the die block may be readily removed and a die block of a different shape or size substituted therefor. As shown more clearly in Figs. 2, 4, 6, 17 and 18, a plate or block 180 is held to the top of the die block 19 by means of suitable screws, and said plate is formed with a vertical stud or projection 181 fitting in a socket 182 formed in the lower end of the plunger 23. The stud or projection 181 is tightly but removably held in the socket 182 by means of a block 183 forming a part of the wall of the socket, and held to the lower end of the plunger 23 by clamping screws 184. To further assist in holding the die block to the plunger 23 a set screw 185 is tapped through the block 183 and is adapted to be threaded into and out of engagement with the stud or shank 181. It will be obvious that by loosening the screws 184 and 185 the die block 19 may be readily detached from the plunger 23, and another block substituted therefor. To adapt the machine for use in connection with die blocks of different height or for operating upon sheet metal blanks of different gage or thickness the plunger 23 is adapted to be adjusted vertically with relation to the cross-head 22, by means of lock nuts 24 and 25 threaded on the reduced upper end of the plunger 23. The plunger 23 is held against rotation by means of vertical ribs or keys 186 formed at opposite sides thereof working in key-ways 187 formed in the cross-head 22.

When the die block 19 is changed the end-wall forming blocks 21 are also removed, and blocks of a size and shape adapted to coöperate with the new die block are substituted therefor. As more clearly shown in Figs. 2, 6, and 13 to 16, the blocks 21 are removably held to the brackets 88 by means of a tapered pin 188, threaded at its upper end and extending through an aperture in the outer end of a projection 189 formed integrally with the bracket 88. The projection 189 is provided with a vertical slot 190 extending inwardly from its outer edge to adapt the slotted projection to be expanded by the tapered pin 188 in the dove-tail or under-cut recess 191 formed in the outer side of the end-wall forming block 21 to detachably lock the block on the projection 189. The brackets 88 are held to the lower ends of the arms 26 by means of bolts 192, and the brackets are held against rotation by means of keys 193 which extend through complementary key-ways formed in the bolts 192, brackets 88, and the lower ends of arms 26.

The supporting and actuating devices for the end-wall forming blocks 21 are adjustable toward and from each other to adapt the same for use in connection with die blocks of different lengths, and said devices are also adjustable to vary the angle of the path of the die blocks to cause the die blocks to move in a path parallel with the inclined end walls of die blocks having end walls of various inclinations. As more clearly shown in Figs. 1, 2, 4, 8 and 20, the arms 26 which support the die blocks are adjustable toward and from each other simultaneously by means of a hand wheel 194, held to a stub shaft 195 journaled in the top cross member 3 of the main frame of the machine. A beveled pinion 196 is fixed to the stud shaft 195 and meshes with a beveled pinion 197 fixed to a rod 198 journaled in the cross member 3 and provided with oppositely threaded portions extending through threaded apertures in lugs 199 extending upwardly from slides 200. Each of the slides 200 is slidably supported at its edges in slots or guide-ways 201 formed in the opposite sides of the frame member 3. Each pair of guide arms 86 is adjustably held to one of the slides 200 by means of a bolt 202, extending through arcuate slots 203 in the upper ends of the arms 86, and extending through the slots 201 in the frame member 3 and through apertures in the slides 200. A pivot bolt 204 extends through apertures in the upper ends of the arms 86, and through the slots 201 and apertures in the slide 200. It will be obvious that by loosening the nuts on the bolts 202 the arms 86 may be swung about the pivot bolts 204 to vary the inclination of said arms and the inclination of the slots 85 therein to cause the arms 26 which support the end-wall forming blocks 21 to move upwardly and downwardly in a path having a degree of inclination corresponding with the inclination of the end walls of the die block. It will also be obvious that by rotating the hand wheel 194 the slides 200 may be simultaneously adjusted toward or from each other, and that the pairs of arms 86 and 26 together with the blocks 21 may thus be adjusted simultaneously toward and from each other. To provide a broad bearing for the upper ends of the adjustable arms 86, plates 205 may be interposed between the outer sides of the frame member 3 and the upper ends of the arms 86. To assist in resisting the thrust of corner-fold benders 63 the brackets 88 supporting end-wall forming blocks 21 may be provided with depending tongues or projections 225 adapted to engage in grooves 226 formed in the upper surfaces of bars 227 held to the table 4, as shown more clearly in Figs. 2, 5, 14, 15 and 16, when the blocks 21 are in lowered position.

The gages 50 are held to the brackets 88, and are adjustable toward and from each other. As shown more clearly in Figs. 13, 14 and 16, the gages 50 are substantially L-shaped and each gage is detachably held to a block or slide 206 by means of a screw 207. The slide 206 is slidably held in under-cut guide-ways in a block 208 held in a recess in the top of the bracket 88 by means of screws 281. The slide 206 is adjustable in the guide-way in block 208 by means of a screw 209, the threads of which engage complementary threads formed in the blocks 206 and 208. The screw 209 is held against movement longitudinally of the block 208 by means of a suitable locking plate 210 fastened to one end of said block, and formed with a suitable slot engaging a reduced portion 211 of the screw 209.

The depending gage plates 51 and 52 held to the frames or brackets 53 and 54 are adjustable toward and from each other. As shown more clearly in Figs. 17 to 19, each of said gage plates 51 and 52 is detachably held to a slide 212 by means of a set screw 213. The slide 212 is provided with outwardly extending flanges 214 at opposite sides thereof engaging in suitable guide-ways in the gage-plate supporting frame or bracket. The slide 212 is adjustable relatively to the supporting bracket by means of a threaded rod 215, extending through a threaded aperture in the slide and journaled in the frame. The threaded rods 215 are held against longitudinal movement by means of suitable set screws 216, and it will be obvious that by rotating the rod the slide 212 may be shifted back and forth along the guide-ways in the frame. The slide 212 may be locked in its adjusted position by means of a set screw 217 extending through a slot in a plate 218 secured to the bracket or supporting frame. The gage plates 51 and 52 may be provided with slots 219 through which the locking screws 213 extend in order to permit said gage plates to be adjusted relatively to the slides 212.

The pivoted frame 54 which supports the gage plate 52 is removably held to the front side member 30 of the cross-head 29 to permit said frame and gage plate to be detached in order to afford more convenient access to the table 4 and the devices mounted thereon when said devices are being adjusted or replaced. The pivot pins 55 are slidable in registering bearings 220 and 221 formed respectively in bosses held to the cross-head 29, and the frame 54. The pivot pins 55 are normally projected into the bearings 221 on the frame 54 by means of suitable coil springs 222, and are adapted to be withdrawn from the bearings 221 wholly within the bearings 220 by means of pins or arms 223 held to the reduced outer ends of said pivot pins and extending outwardly through suitable slots 274 in the bosses formed with the bearings 220. By retracting the pivot pins 55 from the bearings 221 in the frame 54 and shifting the arm 56 to disengage the shank of stop pin 59 from slot 60 in said arm 56, the frame 54 may be disconnected from the cross-head 29.

When the die block 19 is removed and a die block of a different size or shape substituted therefor, the side-wall bending plates 20 are also removed and plates of a length and height corresponding to the new die block are attached to the supports for the side-wall bending plates. The plates 20 are adjustably held to their supports to adapt the working faces of the plates to be adjusted at an angle corresponding with the inclined side walls of the die block. The manner of supporting and adjusting the plates 20 is shown more particularly in Figs. 2, 4, 5, 6, 8, 9, 32 and 34. Each plate 20 is formed with a dove-tail recess 228 in which a correspondingly shaped projection 229 formed in a block 230 engages. The outer side of block 230 is rounded and is seated in a cup-shaped socket 231 formed in the inner face of a slide 232. The block 230 is adjustable vertically in the recess 231 in the slide 232, and is held in its adjusted position by means of a pair of set screws 233 threaded into said block and extending through vertical slots 234 in the slide 232. The slides 232 are adjustable toward and from each other simultaneously to compensate for variations in width of the die block 19, by means of a rod 235 having oppositely threaded portions extending through threaded apertures in supporting blocks 236. The blocks 236 work in an under-cut guideway 237, extending between the inner ends of the ways 65 in which the slides 64 are mounted, and are formed with vertically extending threaded stems 238, extending through apertures in the slides 232. The slides 232 are provided with depending ribs or projections 239 engaging in the narrow upper portion of the under-cut guide-way 237 to hold said slides against rotation about the stems 238 on the supporting blocks 236. The supporting blocks 236 are preferably provided with slots 240, extending upwardly from the under side thereof and intersecting the apertures through which the threaded portions of the rod 235 pass, and are also preferably provided with cam surfaces 241. By constructing the supporting blocks 236 in this manner, it will be obvious that by tightening the nuts 242 threaded on the upper ends of the stems 238 the split lower ends of the blocks 236 will be caused to tightly grip the threaded portions of the rod 235, thus securely holding the blocks 236 and the side-wall bending plates 20 supported thereon in adjusted position. The dove-tail sliding and interlocking connection 228 and 229 between the plates 20 and the blocks 230 permits the plates 20 to be forced downwardly until their lower edges are in engagement with the upper surface of the table 4 in whatever adjusted position blocks 230 may be.

The corner-fold flattening plates 89 are preferably made of sufficient length to coöperate with all sizes of die blocks within the capacity of the machine to avoid the necessity of changing the corner-fold flattening plates 89 when the die block 19 is changed.

As shown more particularly in Figs. 1, 2, 5, 6 and 8, the plates 89 are adjustably supported to adapt said plates to coöperate with die blocks of various lengths and having end walls of various inclinations. The slides 90 which actuate the plates 89 have a fixed throw, and in order to adapt the plates 89 to coöperate with die blocks of different lengths the plates are mounted on blocks 243 adjustably held to the upper surfaces of the slides 90 by means of T-bolts 244, the heads of which engage in the lower widened portions of I-slots or under-cut grooves 245 formed in the upper surfaces of the slides 90. Each plate 89 is held to a head 246 formed at one end of a vertically swinging arm 247 pivoted at 248 between a pair of vertically extending brackets or flanges 249 formed on plate 243. A bolt 250 extends through an aperture in the outer end of the swinging arm 247 and through arcuate slots 251 formed in the outer ends of the brackets 249. It will be obvious that by loosening the nut on the bolt 250 the arm 247 may be rocked about its pivot to present the plate 89 at any desired angle with respect to the table 4, and that the plate 89 may be locked in its adjusted position by tightening said nut. In order to permit the lower edge of the plate 89 to be always maintained in engagement with the upper surface of the table 4 in whatever position the arm 247 may be adjusted, the plate 89 is slidably held to the head 246, said plate being formed with a vertically extending under-cut groove or recess 252 adapted to receive a dove-tail or outwardly flaring projection 253 formed on the head 246. The head 246 is slotted vertically, as shown at 254, to adapt the projection 253 to be expanded into the recess 252 by means of a tapered pin 255.

The corner-fold benders 63 are not changed when the die block 19 is changed, but are adjustably mounted (as shown more clearly in Figs. 1, 4, 5, 6, and 9 to 12) to adapt the benders to coöperate with die blocks of various sizes, and having side walls of various inclinations. To adapt the heads 83 of the corner-fold benders 63 to coöperate with the beveled ends of end-wall forming blocks 21 which are inclined to correspond with the inclination of the side walls of the die block, the head 83 of each corner-fold bender is held to a vertically adjustable arm 256 pivotally held to the bender 63 on a horizontally extending stud or pivot 257. The arm 256 is held in its adjusted position by a clamping bolt 258 which extends through an aperture in the outer end of said arm, and works in an arcuate slot 259 in a lug or ear 260 formed integrally with the bender 63. To adapt the lower edge of the head 83 of the bender to be maintained in engagement with the top of the table 4 in various adjusted positions of the arm 256, said head 83 is formed with a dove-tail projection 261 slidably confined in a vertically extending under-cut groove or recess formed in the inner end of the arm 256.

To adapt the benders 63 to coöperate with die blocks of different lengths, the benders of each pair are adjustable toward and from each other by loosening the pivot bolts 78 and the guide bolts 81. The heads of the pivot bolts 78 are slidably confined in under-cut grooves 262 formed in longitudinally extending ribs at the inner edges of a plate 263, adjustably held to slide 64 to reciprocate therewith. It will be obvious that by loosening the bolts 78 and 81 the benders of each pair may be moved toward or from each other along the grooves 262 in plate 263 and slots 264 in the brackets 80, and may be locked in their adjusted positions by tightening said bolts.

To adapt the benders 63 to coöperate with die blocks of different widths the pairs of benders are adjustable toward and from each other by adjusting the plates 263 relatively to the slides 64 and adjusting the brackets 80 relatively to the table 4. The brackets 80 are adjustable toward and from each other on the table 4, and are held in their adjusted positions by bolts 265 which extend through apertures in the brackets and have the heads thereof slidably confined in the widened lower portions of substantially I-shaped grooves 266, formed in the upper surface of the table 4, as shown more clearly in Figs. 1 and 10. It will be obvious that by loosening the clamping nuts on the bolts 265 the brackets 80 may be shifted toward and from each other, and may be locked in their adjusted position by tightening said nuts. The plates 263 are adjustable toward and from each other by means of screws or threaded rods 267 which are journaled in lugs 268 formed integrally with the slides 64, and are held against longitudinal movement by means of suitable collars. The threaded portions of the rods 267 extend through threaded apertures in lugs 269 formed integrally with the plates 263, and it will be obvious that by rotating the threaded rods 267 the plates 263 may be adjusted toward and from each other upon the slides 64. The plates 263 are guided during their adjustment by parallel ribs 270 (Fig. 1) working in the upper widened portions of substantially I-shaped grooves 271 formed in the upper surfaces of the slides 64. The plates 263 are locked to the slides 64 in their adjusted positions by means of bolts 272, extending through apertures in the plates 263 and having the heads at the lower ends thereof engaging in the widened lower portions of the I-shaped slots or grooves 271 formed in the upper surfaces of the slides 64. It will be obvious that by loosening the nuts threaded on the upper ends of the bolts 272 the plates 263 may be adjusted relatively to the slides 64 by rotating the threaded rods 267, and that the plates 263 may be locked to the slides 264 to reciprocate with said slides by tightening the nuts on the bolts 272. The brackets 80 and the plates 263 are adjusted to the proper relative positions to cause the guide bolts 81 to impart the desired rocking movement to the benders 63 when the slides 64 and plates 263 are reciprocated by the levers 70, as heretofore described. The brackets 80 are provided with guide ribs 273 (Figs. 1 and 10) on the under sides thereof, similar to the ribs 270 on the plates 263, these ribs being adapted to move in the widened upper portions of the I-slots 266 to guide the brackets 80 during the adjustment thereof, and to assist in holding said brackets against lateral movement.

What we claim is:

1. In a machine of the class described, the combination of a female die having relatively movable parts, a male die, means for moving the dies into and out of engagement, means for imparting a relative movement between the female die parts, and means actuated by said die-part-moving means for positioning a blank to be shaped by said dies.

2. In a machine of the class described, the combination of a female die comprising relatively reciprocable parts, a male die, means for moving said male die into and out of engagement with the female die, means for moving the parts of the female die into and out of coöperative relation, and means actuated by the movement of the parts of the female die into coöperative relation for automatically centering a blank relatively to said dies.

3. In a machine of the class described, the combination of a male die, a female die having side members and end members movable relatively to each other, means for moving said dies into and out of engagement, means for moving the female die members into and out of coöperative relation, and means movable with the movable female die members for supporting a blank and automatically positioning and centering the same over said female die in advance of the engagement of the dies.

4. In a machine of the class described, the combination of relatively reciprocable male and female dies, said female die having relatively reciprocable side and end walls, means for moving said dies into and out of engagement, means for moving the relatively reciprocable female die walls into and out of coöperative relation, and means carried by the said die-wall moving means for automatically centering a blank over the female die in advance of the engagement of the dies.

5. In a machine of the class described, the combination of a vertically reciprocable male die, a female die having stationary side walls and diagonally reciprocable end walls adapted to support a blank at a point between said dies, means for moving said male die into and out of engagement with the female die, means for moving the end walls of the female die downwardly and inwardly into coöperative relation with the side walls thereof in advance of the engagement of said dies, and means movable downwardly and inwardly with said end walls adapted to engage a blank supported on said end walls and center said blank in advance of the engagement of the dies.

6. In a machine of the class described, the combination of a reciprocable male die, a female die having stationary side walls and reciprocable end walls adapted to support a blank at a point between said dies, means for moving said male die into and out of engagement with the female die, means for moving the end walls of the female die into coöperative relation with the side walls thereof in advance of the engagement of said dies, and means movable with end walls of the female die for automatically centering the blank in advance of the engagement of the dies.

7. In a machine of the class described, the combination of a reciprocable male die, a female die having stationary side walls and reciprocable end walls adapted to support a blank at a point between said dies, means for moving said male die into and out of engagement with the female die, means for moving the end walls of the female die into coöperative relation with the side walls thereof in advance of the engagement of said dies, and coöperating pairs of gages actuated by the movement of the end walls of the female die into coöperative relation with the side walls thereof for automatically centering the blank supported by said end walls in advance of the engagement of the dies.

8. In a machine of the class set forth, the combination of a support, a female die member having stationary side walls mounted on said support and end walls normally held above said support and movable downwardly and inwardly into coöperative relation with the side walls, a vertically reciprocable male die member normally held above the end walls of said female die member, means for moving said male die member and the end walls of the female die member toward and from the support, and means movable with the end walls of the female die member for supporting a blank between the die members and for automatically centering said blank in advance of the engagement of the die members.

9. In a machine of the class set forth, the combination of a support, a female die having stationary side walls held on said support and end walls normally held above the support and adapted to support a blank, said end walls being movable downwardly and inwardly into coöperative relation with the side walls, a vertically reciprocable male die normally held in a plane above the end walls of the female die, means for moving the male die and the end walls of the female die in unison toward the support, means for automatically centering the blank during said movement of the male die and end walls of the female die, and means whereby the male die may be moved downwardly relatively to the end walls of the female die after said end walls have been moved into coöperative relation with the side walls of the female die to shape the centered blank.

10. In a machine of the class set forth, the combination of a frame, a table supported in said frame, a female die having stationary side walls mounted on said table and end walls normally held above said table and adapted to support a blank, a vertically reciprocable cross-head from which said end walls of the female die are suspended, a second vertically reciprocable cross-head, a male die suspended from said second cross-head and normally held in a plane above the end walls of the female die, means for reciprocating said cross-heads toward and from the table, and means actuated by the movement of one of said cross-heads toward the table for automatically centering the blank supported by the end walls of the female die in advance of the engagement of the dies.

11. In a machine of the class set forth, the combination of a frame, relatively reciprocable male and female dies, a cross-head reciprocably mounted in said frame and carrying one of said dies, a second cross-head reciprocably mounted in said frame, coöperating devices carried by said second cross-head for automatically centering a blank over one of said dies in advance of the engagement of the dies, and means adapted to impart a movement to said cross-heads in unison to actuate the blank-centering devices in advance of the engagement of the dies and to impart a further movement to the first cross-head relatively to the second cross-head to cause the movable die member to engage the other die member.

12. In a machine of the class set forth, the combination of a frame, a table supported in the frame, a pair of cross-heads reciprocably mounted in the frame, a shaft, means for rotating said shaft and for automatically stopping the same after a single revolution, a male die carried by one cross-head, a female die having side walls held to said table and end walls held to the other of said cross-heads and normally supported above the side walls, means carried by one of said cross-heads for supporting and automatically centering a blank relatively to said dies in advance of the engagement thereof, means actuated by said shaft for moving the cross-heads toward and from the table to move the male die into engagement with the female die after the end walls thereof have been moved into coöperative relation with the side walls and return said male die after the end walls have been moved out of coöperative relation with the side walls, and means actuated by said shaft after the return movement of the end walls of the female die and in advance of the return movement of the male die for bending the surplus metal at the corners of the partially shaped blank against the bent up end walls of the blank.

13. In a machine of the class set forth, the combination of a frame, a table supported in the frame, a pair of cross-heads reciprocably mounted in the frame, a shaft, means for rotating said shaft and for automatically stopping the same after a single revolution, a male die carried by one cross-head, a female die having side walls held to said table and end walls held to the other of said cross-heads and normally supported above the side walls, means carried by one of said cross-heads for centering a blank relatively to said die in advance of the engagement thereof, means actuated by said shaft for removing the cross-heads toward and from the table to move the male die into engagement with the female die after the end walls thereof have been moved into coöperative relation with the side walls and return said male die after the end walls have been moved out of coöperative relation with the side walls, means actuated by said shaft after the return movement of the end walls of the female die and in advance of the return movement of the male die for bending the surplus metal at the corners of the partially shaped blank against the bent up end walls of the blank, and independent counter-balancing means for said cross-heads.

14. In a machine of the class set forth, the combination of a frame, a table supported in the frame, a pair of cross-heads reciprocably mounted in the frame, a male die carried by one cross-head, a female die having side walls held to the table and end walls held to the other of said cross-heads and normally supported above the side walls, means for moving the cross-heads toward and from the table, said means being adapted to move the end walls of the female die into coöperative relation with the side walls and spaced therefrom at the corners of said die in advance of the engagement of the dies and to return said end walls to normal position in advance of the return movement of the male die, means reciprocable diagonally past the corners of the female die to bend the radially extending folds of surplus material forced through the openings at the corners of said die opposite the end walls of the female die, and means operable after the return movement of the end walls of the female die and prior to the return movement of the male die to flatten the partially bent folds of material against the end walls of the blank.

15. In a machine of the class set forth, the combination of a frame, a table supported in the frame, a pair of cross-heads reciprocably mounted in the frame, a male die carried by one cross-head, a pair of parallel plates held to the table and coöperating with the male die to bend the side edges of a blank, a pair of parallel blocks held to the other of said cross-heads and coöperating with the male die to bend the end edges of a blank and formed with beveled ends, means for moving the cross-head carrying said blocks toward the table to position said blocks with their beveled ends adjacent the ends of said parallel plates and spaced therefrom in advance of the movement of the male die into engagement with said blocks and plates, means for bending the folds of surplus material forced between the adjacent ends of said plates and blocks against the beveled ends of said blocks, means for returning said blocks to normal position in advance of the return movement of the male die, and means for flattening the partially bent corner folds against the bent up end walls of the blank after the return movement of said blocks and prior to the return movement of the male die.

16. In a machine of the class described, the combination of a support, a die block, means for moving said die block toward and from the support, a pair of reciprocable wall-bending members formed with beveled ends and normally held above the support, a pair of wall-bending members held to the support and coöperating with said reciprocable wall-bending members to form a substantially rectangular female die having vertical openings at each corner, means for moving the reciprocable wall-bending members toward the support to place said members in coöperative relation with the wall-bending members held to the support in advance of the engagement of the die block with said members, means reciprocable past the vertical openings at the corners of the female die formed by said wall-bending members to bend the folds of surplus material forced through said openings against the beveled ends of the reciprocable wall-bending members, means for returning said reciprocable wall-bending members to normal position in advance of the return movement of the die block, and reciprocable means for flattening the bent folds of surplus material against the outer side of the pan walls prior to the return movement of the die block.

17. In a pan stamping machine, the combination of a support, a male die, means for moving said male die toward and from the support, a pair of wall-bending members held to the support, a pair of reciprocable wall-bending members formed with beveled ends and normally held above the other wall-bending members, means for moving said reciprocable wall-bending members toward the support in advance of the male die and for returning said members in advance of the male die, said pairs of wall-bending members being adapted to form a female die to receive the die block having open corners, means movable with the reciprocable wall-bending members adapted to support and center a blank over the female die formed by the pairs of wall-bending members in advance of the engagement of the male die therein, means reciprocably mounted on the support to move across the open corners of the female die while the male die is engaged therein to bend the folds of surplus material forced through said corners against the beveled ends of the reciprocable wall-bending members, and means reciprocably mounted on the support for pressing said bent folds of material against the outer side of the pan walls exposed by the return movement of the reciprocable wall-bending members prior to the return movement of the male die.

18. In a machine of the class set forth, the combination of a vertically reciprocable male die, a female die having open corners and vertically-reciprocable oppositely-disposed walls having beveled ends, means for moving the male die into and out of engagement with the female die, means for bending the radially extending folds of surplus material forced through the open corners of the female die against the beveled ends of the reciprocable walls of the female die opposite the walls of the article formed by said reciprocable die walls, means for subsequently moving the reciprocable walls of the female die out of coöperative relation with the other walls thereof, and means for pressing said bent folds of material against the walls of the article exposed by said movement of the female die walls prior to the return movement of the male die.

19. In a machine of the class described, the combination of means for pressing a blank into a substantially rectangular receptacle having folds of surplus material extending radially from the corners thereof, means shiftable diagonally past the corners of the receptacle and transversely of the plane of said radially extending corner folds for bending pairs of said folds toward each other around the corners of said receptacle, and means for pressing said pairs of bent folds flatly against opposite sides of the receptacle.

20. In a machine of the class described, the combination of means for pressing a blank into a substantially rectangular receptacle having upwardly and outwardly inclined walls and folds of surplus material extending outwardly from the corners thereof, devices shiftable diagonally past the corners of the receptacle and transversely of the plane of said corner folds for bending said folds of material in pairs toward each other around the corners of the receptacle, and means for pressing said bent pairs of folds of material flatly against the inclined walls of the receptacle at opposite sides thereof.

21. In a machine of the class described, the combination of a vertically reciprocable male die having downwardly and inwardly tapering walls, a female die having open corners and downwardly and inwardly inclined walls, means for moving the male die into and out of engagement with the female die, means for shifting two oppositely disposed walls of the female die to expose opposite sides of a partially formed article, means for bending pairs of folds of surplus material forced through the open corners of the female die opposite the sides of the receptacle formed by said shiftable die walls, and means for pressing said bent pairs of folds against the inclined walls of the receptacle exposed by shifting said female die walls prior to the withdrawal of the male die.

22. In a machine of the class described, the combination of a vertically reciprocable male die having downwardly and inwardly tapering walls, a female die having open corners and downwardly and inwardly inclined walls, means for moving the male die into and out of engagement with the female die, means for moving two oppositely disposed walls of the female die upwardly and outwardly to expose oppositely inclined sides of a partially formed article, said movable die walls having beveled ends, means for bending pairs of folds of surplus material forced through the open corners of the female die toward each other against the beveled ends of the movable die walls prior to the upward and outward movement of said walls, and means for pressing said bent pairs of folds against the inclined walls of the receptacle exposed by the movement of said die walls prior to the withdrawal of the male die.

23. In a pan stamping machine, the combination of a die-block, relatively reciprocable devices coöperating with said die block to bend up the edges of a blank, and independent mechanisms coöperating respectively with said relatively reciprocable devices and said die block for folding the surplus material at the corners of the blank against the bent up edges of the blank.

24. In a pan stamping machine, the combination of a die block, sets of devices movable relatively to each other and coöperating with said die block to bend up the edges of a blank, means coöperating with the movable set of said devices for bending the folds of surplus material at the corners of the blank to bring said folds of material opposite the ends of the blank acted on by said set of devices, means for moving said movable set of devices out of coöperative relation with the die block, and means coöperating with said die block for pressing the bent folds of surplus material against the bent up edges of the blank exposed by shifting the movable set of edge-bending devices.

25. In a pan stamping machine, the combination of a die block, means coöperating with said die block to bend up the side edges of a blank, means movable relatively to said side-edge-bending means adapted to coöperate with the die block to bend up the end edges of a blank, means for bending the folds of surplus material formed at the corners of the blank by said edge-bending means around the corners of the partially shaped blank to points opposite the bent up ends thereof, and means coöperating with the die block for pressing the bent folds of surplus material against the bent up ends of the blank.

26. In a pan stamping machine, the combination of a die block, means for automatically positioning a blank to be shaped by said block, means coöperating with said block to bend the side edges of a blank, means movable relatively to said block and side-edge-bending means adapted to coöperate with said block to bend the end edges of a blank, means for bending the folds of surplus material formed at the corners of the blank by said edge-bending means to point opposite the bent up ends thereof, and means coöperating with the die block for pressing the bent folds of surplus material against the bent up ends of the blank.

27. In a pan stamping machine, the combination of a die block, means for automatically positioning a blank to be shaped by said block, means coöperating with said block to bend the side edges of a blank, means movable relatively to said block and side-edge-bending means adapted to coöperate with said block to bend the end edges of a blank, means coöperating with said end-edge-bending means to bend the folds of surplus material formed at the corners of the partially shaped blank to points opposite the bent up ends of the blank, and means coöperating with the die block for pressing said bent folds of surplus material against the bent up ends of the blank.

28. In a pan stamping machine, the combination of relatively shiftable means adapted to simultaneously bend up the four sides of a substantially rectangular blank, and relatively shiftable successively acting groups of devices adapted to coöperate in succession with different parts of said relatively shiftable side-bending means to bend and flatten the folds of surplus material at the corners of the partially shaped blank in pairs against opposite sides of the partially shaped blank.

29. In a pan stamping machine, the combination of a frame, a table mounted in the frame, a vertically reciprocable cross-head mounted in the frame above the table, a vertically adjustable die-block support depending from said cross-head, a die-block detachably held to said support, side-wall bending members, supports for said side-wall bending members held to the table and adjustable toward and from each other, means for detachably holding said side-wall bending members to their supports, a second vertically reciprocable cross-head mounted in the frame above the table, end-wall bending members, supports for said end-wall bending members held to said second cross-head and freely slidable longitudinally thereof, means for detachably holding said end-wall bending members to their supports, adjustable guiding means held to the frame for imparting a sliding movement to the supports of the end-wall bending members toward and from each other during the reciprocation of said second cross-head, and adjustable devices reciprocably mounted on the table for bending the folds of surplus material formed at the corners of a blank by said wall-bending members against the bent up end walls of the blank.

30. In a pan stamping machine, the combination of a frame, a table mounted in the frame, a vertically reciprocable cross-head mounted in the frame above the table, a vertically adjustable die-block support depending from said cross-head, a die block detachably held to said support, side-wall bending members, supports for said side-wall bending members held to the table and adjustable toward and from each other, means for detachably holding said side-wall bending members to their supports, a second vertically reciprocable cross-head mounted in the frame above the table, end-wall bending members, supports for said end-wall bending members held to said second cross-head and freely slidable longitudinally thereof, means for detachably holding said end-wall bending members to their supports, means for adjusting the supports of the end-wall bending members toward and from each other, adjustable guiding means held to the frame for imparting a sliding movement to the supports of the end-wall bending members toward and from each other during the reciprocation of said second cross-head, two pairs of corner-fold bending devices reciprocably mounted on the table, means for adjusting said pairs of bending devices toward and from each other, corner-fold flattening members reciprocably mounted on the table, and means for adjusting said flattening members toward and from each other.

31. In a pan stamping machine, the combination of a frame, a table mounted in the frame, a vertically reciprocable cross-head mounted in the frame above the table, a vertically adjustable die-block support depending from said cross-head, a die-block detachably held to said support, side-wall bending members, supports for said side-wall bending members held to the table and adjustable toward and from each other, means for detachably holding said side-wall bending members to their supports, a second vertically reciprocable cross-head mounted in the frame above the table, end-wall bending members, supports for said end-wall bending members held to said second cross-head and freely slidable longitudinally thereof, means for detachably holding said end-wall bending members to their supports, means for adjusting the supports of the end-wall bending members toward and from each other, adjustable guiding means held to the frame for imparting a sliding movement to the supports of the end-wall bending members toward and from each other during the reciprocation of said second cross-head, two pairs of corner-fold bending devices reciprocably mounted on the table, means for adjusting said pairs of corner-fold bending devices toward and from each other, means for adjusting each of said corner-fold bending devices to vary the angle of its operating face with relation to the plane of the table, corner-fold flattening members reciprocably mounted on the table, means for adjusting said flattening members toward and from each other, and means for adjusting said flattening members to vary the angle of the operating faces thereof with relation to the plane of the table.

32. In a pan stamping machine, the combination of a frame, a table mounted in the frame, a vertically reciprocable cross-head mounted in the frame above the table, a vertically adjustable die-block support depending from said cross-head, a die-block detachably held to said support, side-wall bending members, supports for said side-wall bending members held to the table and adjustable toward and from each other, means for detachably holding said side-wall bending members to their supports, a second vertically reciprocable cross-head mounted in the frame above the table, end-wall bending members, supports for said end-wall bending members held to said second cross-head and freely slidable longitudinally thereof, means for detachably holding said end-wall bending members to their supports, means for adjusting the supports of the end-wall bending members toward and from each other, adjustable guiding means held to the frame for imparting a sliding movement to the supports of the end-wall bending members toward and from each other during the reciprocation of said second cross-head, a pair of depending gage plates held to opposite sides of said second cross-head, means for adjusting said gage plates toward and from each other, means for automatically imparting a movement to one of said gage plates toward and from its coöperating gage plate during the reciprocation of the second cross-head, a second pair of coöperating gage plates mounted on the supports for the end-wall bending members, and means for adjusting said second pair of gage plates toward and from each other.

33. In a pan stamping machine, the combination of a frame, a table mounted in the frame, a vertically reciprocable cross-head mounted in the frame above the table, a vertically adjustable die-block support depending from said cross-head, a die-block detachably held to said support, side-wall bending members, supports for said side-wall bending members held to the table and adjustable toward and from each other, means for detachably holding said side-wall bending members to their supports, a second vertically reciprocable cross-head mounted in the frame above the table, end-wall bending members, supports for said end-wall bending members held to said second cross-head and freely slidable longitudinally thereof, means for detachably holding said end-wall bending members to their supports, means for adjusting the supports of the end-wall bending members toward and from each other, adjustable guiding means held to the frame for imparting a sliding movement to the supports of the end-wall bending members toward and from each other during the reciprocation of said second cross-head, two pairs of corner-fold bending devices reciprocably mounted on the table, means for adjusting said pairs of corner-fold bending devices toward and from each other, means for adjusting each of said corner-fold bending devices to vary the angle of its operating face with relation to the plane of the table, corner-fold flattening members reciprocably mounted on the table, means for adjusting said flattening members toward and from each other, means for adjusting said flattening members to vary the angle of the operating faces thereof with relation to the plane of the table, a pair of depending gage plates held to opposite sides of said second cross-head, means for adjusting said gage plates toward and from each other, means for automatically shifting one of said gage plates toward and from its coöperating gage plate during the reciprocation of the second cross-head, a second pair of coöperating gage plates mounted on the supports for the end-wall bending members, and means for adjusting said second pair of gage plates toward and from each other.

34. In a pan stamping machine, the combination of a frame, a table mounted in the frame, a vertically reciprocable cross-head mounted in the frame above the table, a vertically adjustable die-block support depending from said cross-head, a die-block detachably held to said support, side-wall bending members, supports for said side-wall bending members held to the table and adjustable toward and from each other, connections between the side-wall bending members and their supports whereby said members may be detachably held to the supports at various angles relatively to the plane of the table, a second vertically reciprocable cross-head mounted in the frame above the table, end-wall bending members, supports for said end-wall bending members held to said second cross-head and freely slidable longitudinally thereof, means for detachably holding said end-wall bending members to their supports, adjustable guiding means held to the frame for imparting a sliding movement to the supports of the end-wall bending members toward and from each other during the reciprocation of said second cross-head, and adjustable devices reciprocably mounted on the table for bending the folds of surplus material formed at the corners of a blank by said wall-bending members against the bent up end walls of the blank.

35. In a pan stamping machine, the combination of a frame, a table mounted in the frame, a vertically reciprocable cross-head mounted in the frame above said table, a die-block depending from said cross-head, side-wall-bending members held to said table, a second vertically reciprocable cross-head mounted in the frame above the table, end-wall-bending members held to said second cross-head to slide longitudinally thereof, means held to the frame for imparting a sliding movement to said end-wall-bending members toward and from each other during the reciprocation of said second cross-head, a pair of oppositely disposed gage plates depending from said second cross-head, means for imparting a movement to one of said depending gage plates toward and from its coöperating gage plate during the reciprocation of said second cross-head, and a second pair of oppositely disposed coöperating gage plates partaking of the vertical and sliding movements of said end-wall-bending members.

In testimony whereof we hereunto affix our signatures this 31st day of October, 1917.

HARRY J. HAIGH.
IRVING S. BODKIN.